(12) United States Patent
Kawai et al.

(10) Patent No.: US 9,601,091 B2
(45) Date of Patent: Mar. 21, 2017

(54) INFORMATION PROCESSING APPARATUS AND INFORMATION PROCESSING METHOD

(71) Applicant: Sony Computer Entertainment Inc., Tokyo (JP)

(72) Inventors: Aritoki Kawai, Tokyo (JP); Takayuki Shinohara, Tokyo (JP); Hidehiko Morisada, Tokyo (JP)

(73) Assignees: Sony Corporation, Tokyo (JP); Sony Interactive Entertainment Inc., Tokyo (JP)

( * ) Notice: Subject to any disclaimer, the term of this patent is extended or adjusted under 35 U.S.C. 154(b) by 124 days.

(21) Appl. No.: 14/401,867

(22) PCT Filed: Apr. 26, 2013

(86) PCT No.: PCT/JP2013/002847
§ 371 (c)(1),
(2) Date: Nov. 18, 2014

(87) PCT Pub. No.: WO2013/179567
PCT Pub. Date: Dec. 5, 2013

(65) Prior Publication Data
US 2015/0145886 A1    May 28, 2015

(30) Foreign Application Priority Data
May 30, 2012 (JP) ................................ 2012-123717

(51) Int. Cl.
*G06T 11/60*    (2006.01)
*G09G 5/37*    (2006.01)
(Continued)

(52) U.S. Cl.
CPC ............ *G09G 5/37* (2013.01); *G06F 3/0483* (2013.01); *G06T 11/60* (2013.01); *G06F 3/0482* (2013.01);
(Continued)

(58) Field of Classification Search
CPC ....... G06F 2203/04806; G06F 3/04815; G06F 3/0482; G06F 3/0483; G06T 11/60; G06T 2200/24; G09G 2354/00; G09G 5/37
See application file for complete search history.

(56) References Cited

U.S. PATENT DOCUMENTS 6,563,999 B1    5/2003    Suzuoki
2004/0085347 A1    5/2004    Hagarty, Jr.
(Continued)

FOREIGN PATENT DOCUMENTS

CN    101356493 A    1/2009
JP    06-149648 A    5/1994
(Continued)

OTHER PUBLICATIONS

Machine translated JP H6-149648.*
(Continued)

*Primary Examiner* — Sing-Wai Wu
(74) *Attorney, Agent, or Firm* — Matthew B. Dernier, Esq.

(57) ABSTRACT

In an information processing apparatus, a map view is displayed. On the map view, an image which includes a thumbnail image of an image to be incorporated in a content and identification information added to the thumbnail image is applied as a processing section. Thumbnail images of images which are determined as a link source and a link destination by a link setting for image switching when a display area satisfies a link condition are connected to each other by a line. Further, an order of images between which (Continued)

an image is to be successively switched by an image forward feeding operation is defined by an array of thumbnail images in a sequence setting column. Further, the images are coupled using a dotted line or the like so as to represent a preceding-succeeding relationship thereof. A thumbnail image of an image or a line is operated to update a link setting file and a sequence setting file.

9 Claims, 18 Drawing Sheets

(51) Int. Cl.
*G06F 3/0483* (2013.01)
*G06F 3/0481* (2013.01)
*G06F 3/0482* (2013.01)

(52) U.S. Cl.
CPC ............. *G06F 3/04815* (2013.01); *G06F 2203/04806* (2013.01); *G06T 2200/24* (2013.01); *G09G 2354/00* (2013.01)

(56) References Cited

U.S. PATENT DOCUMENTS

| | | | |
|---|---|---|---|
| 2008/0222552 A1* | 9/2008 | Batarseh | G06F 3/0483 715/776 |
| 2013/0198686 A1 | 8/2013 | Kawai | |

FOREIGN PATENT DOCUMENTS

| | | |
|---|---|---|
| JP | 2001337762 A | 12/2001 |
| JP | 2004152282 A | 5/2004 |
| JP | 2010268195 A | 11/2010 |
| JP | 2012063940 A | 3/2012 |
| JP | 2012069005 A | 4/2012 |
| WO | 2012039435 A1 | 3/2012 |

OTHER PUBLICATIONS

Machine translated JP 2010-268195.*
Machine translated JP 2012-069005.*
International Search Report for corresponding PCT Application No. PCT/JP2013/002847, dated Jul. 2, 2013.
Office Action for corresponding Japanese Patent Application No. 2012-123717, dated Jun. 25, 2013.
International Preliminary Report on Patentability for corresponding PCT Application No. PCT/JP2013/002847, dated Dec. 4, 2014.
EP Search Report for corresponding EP Application No. EP13797449.9, 6 pages, dated Feb. 25, 2016.
Office Action for corresponding CN Application No. 201380026729, 31 pages, dated Nov. 3, 2016.

* cited by examiner

FIG.17

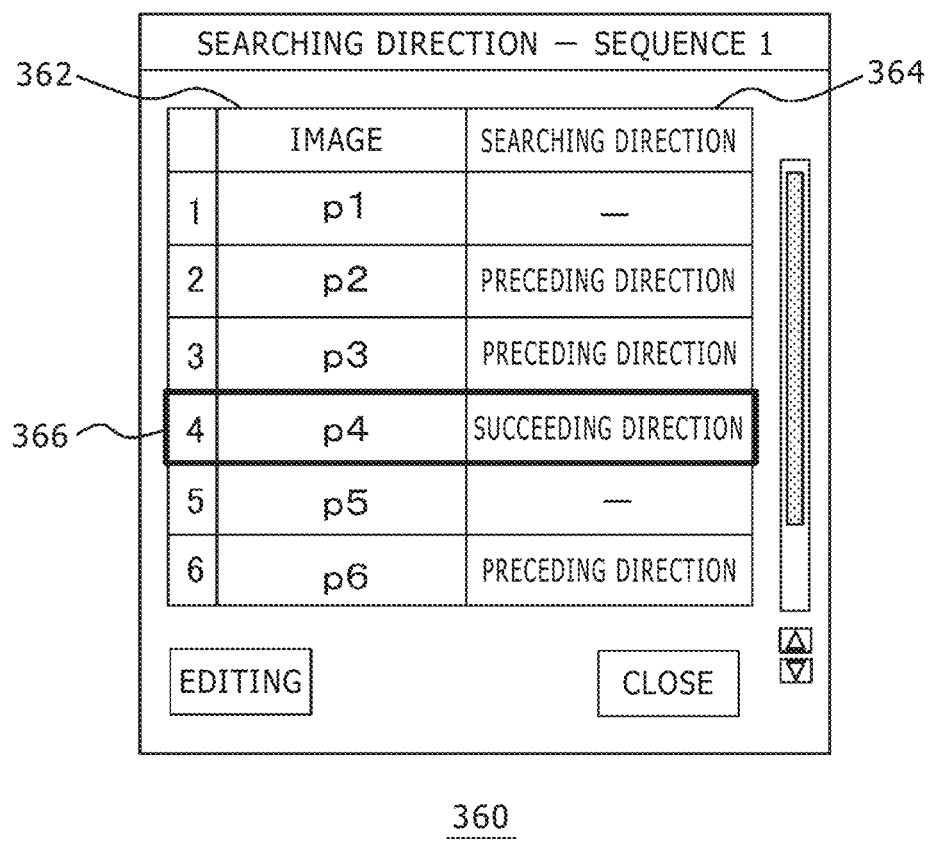

| | IMAGE | SEARCHING DIRECTION |
|---|---|---|
| 1 | p1 | — |
| 2 | p2 | PRECEDING DIRECTION |
| 3 | p3 | PRECEDING DIRECTION |
| 4 | p4 | SUCCEEDING DIRECTION |
| 5 | p5 | — |
| 6 | p6 | PRECEDING DIRECTION |

SEARCHING DIRECTION — SEQUENCE 1

EDITING    CLOSE

INFORMATION PROCESSING APPARATUS AND INFORMATION PROCESSING METHOD

TECHNICAL FIELD

The present invention relates to an image processing technology wherein a movement of a viewpoint with respect to a display image is accepted.

BACKGROUND ART

An entertainment system for home use which not only can execute a game program but also can play a video has been proposed. In this entertainment system for home use, a GPU produces a three-dimensional image which uses polygons (refer to, for example, Patent Literature 1).

Not only a three-dimensional image of a game or the like but also character information and image information of various kinds of contents such as images of homepages, books, magazines, newspapers and advertisements have become very readily available with the spread of the network. Also it has become possible to browse character information or image information in high picture quality irrespective of the scale of an apparatus such as a personal computer or a mobile terminal. Thus, the image processing technology has become essentially required in everyday life.

CITATION LIST

Patent Literature

[PTL 1]
U.S. Pat. No. 6,563,999

SUMMARY

Technical Problem

As the image processing technology becomes familiar, it has become a tendency that the structure of an image displayed as a content and hence of information indicated by the image is complicated and the data size becomes huge. Generally, the information amount and the accessibility a content has have a tradeoff relationship to each other, and to construct an information system which implements the compatibility of the information amount and the accessibility is a work which imposes a burden on a content producer. Even a content produced in such a manner as just described frequently requires updating or modification after time elapses. Therefore, a content production technology and a content confirmation technology by which updating can be carried out readily are demanded.

The present invention has been made in view of such a problem as described above, and it is an object of the present invention to provide a technology by which a content having a high access efficiency is produced readily and a configuration of the content is confirmed readily.

Solution to Problem

A mode of the present invention relates to an information processing apparatus. The information processing apparatus includes a data storage unit configured to store data of a content, which is configured from data of a plurality of images and a plurality of setting files in which rules for image switching are set individually corresponding to a plurality of operation means and in which display is switched to display of a different image in accordance with that one of the rules which corresponds to that one of the operation means whose operation is carried out during display of one image, and a setting screen controlling unit configured to display a correlation map in which preceding-succeeding relationships of images upon display switching described in the plural setting files are represented by reduced images of the plural images and graphics which connect the reduced images to each other.

Another mode of the present invention relates to an information processing method. The information processing method includes the steps of reading out, from a storage apparatus, data of a content, which is configured from data of a plurality of images and a plurality of setting files in which rules for image switching are set individually corresponding to a plurality of operation means and in which display is switched to display of a different image in accordance with that one of the rules which corresponds to that one of the operation means whose operation is carried out during display of one image, and displaying, on a display apparatus, a correlation map in which preceding-succeeding relationships of images upon display switching described in the setting files are represented by reduced images of the plural images and graphics which connect the reduced images to each other.

It is to be noted that also an arbitrary combination of the components described above and the representations of the present invention converted among a method, an apparatus, a system, a computer program, a recording medium on or in which the computer program is recorded and so forth are effective as modes of the present invention.

Advantageous Effects of Invention

With the present invention, it is possible to readily produce an image displaying content which includes much information and has a good accessibility and confirm the substance of the content readily.

BRIEF DESCRIPTION OF DRAWINGS

FIG. 17 is a view depicting a still further example of a screen image rendered by the setting screen controlling unit in the present embodiment.

DESCRIPTION OF EMBODIMENTS

Figure 1:
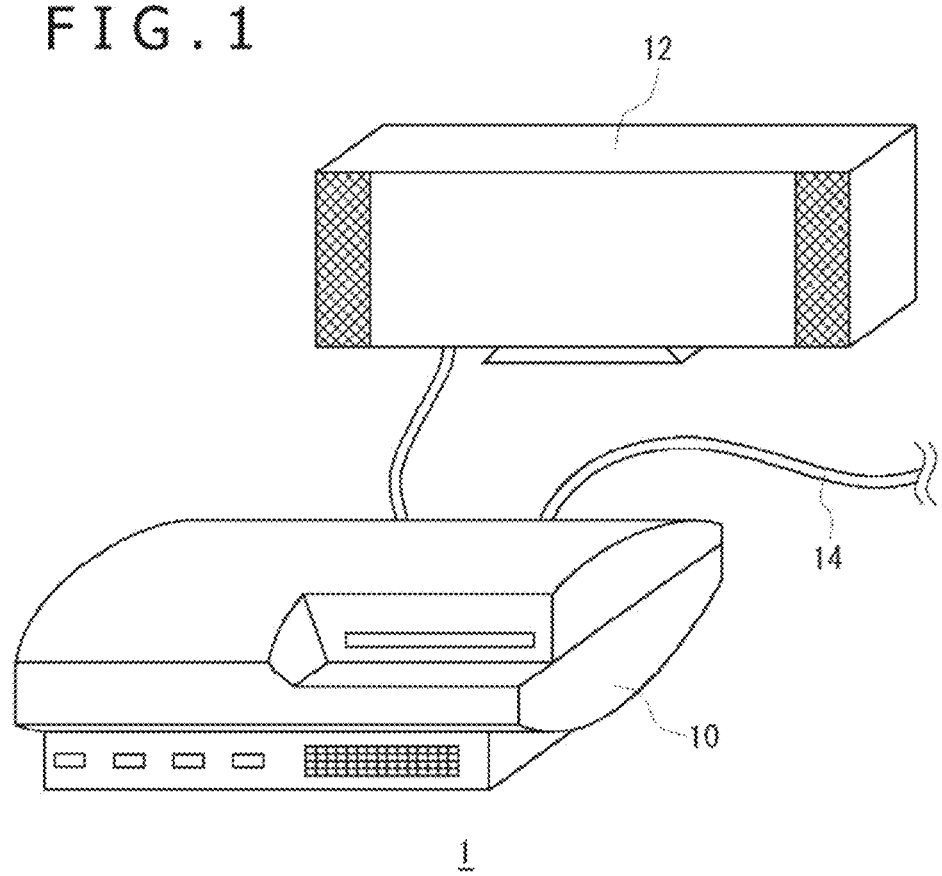
FIG. 1 is a view illustrating an environment in which an information processing system which can be applied to an embodiment is used.

In the present embodiment, a content which involves display of visual information of a book, a newspaper, a magazine, a game image, a menu display image, a homepage image, a map, a photograph, a painting, an advertisement or the like is determined as a processing object. First, a displaying mode of a content applied as a processing target in the present embodiment is described. FIG. 1 illustrates an environment in which an information processing system to which the present embodiment can be applied is used. An information processing system 1 includes an information processing apparatus 10 which executes software for information processing, and a display apparatus 12 which outputs a result of processing by the information processing apparatus 10. The display apparatus 12 may be a television set which has a display unit for outputting an image and a speaker for outputting sound.

The display apparatus 12 may be connected to the information processing apparatus 10 through a wired cable or connected wirelessly through a wireless LAN (Local Area Network) or the like. The information processing apparatus 10 in the information processing system 1 may be connected to an external network such as the Internet through a cable 14 so as to download and acquire a content file. It is to be noted that the information processing apparatus 10 may be connected to an external network by wireless communication.

The information processing apparatus 10 may be, for example, a game apparatus or a personal computer and may implement an information processing function by loading a required application program. The information processing apparatus 10 carries out enlarging/reducing processes of an image to be displayed on a display unit of the display apparatus 12, a scrolling process of the image in an upward, downward, leftward or rightward direction or other processes in accordance with a viewpoint moving request from a user. Such a changing operation of a display area including enlargement/reduction as just described is hereinafter referred to as "viewpoint moving operation." If the user operates an inputting apparatus while viewing an image displayed on the display unit, then the inputting apparatus transmits the inputted information to the information processing apparatus 10.

Figure 2:
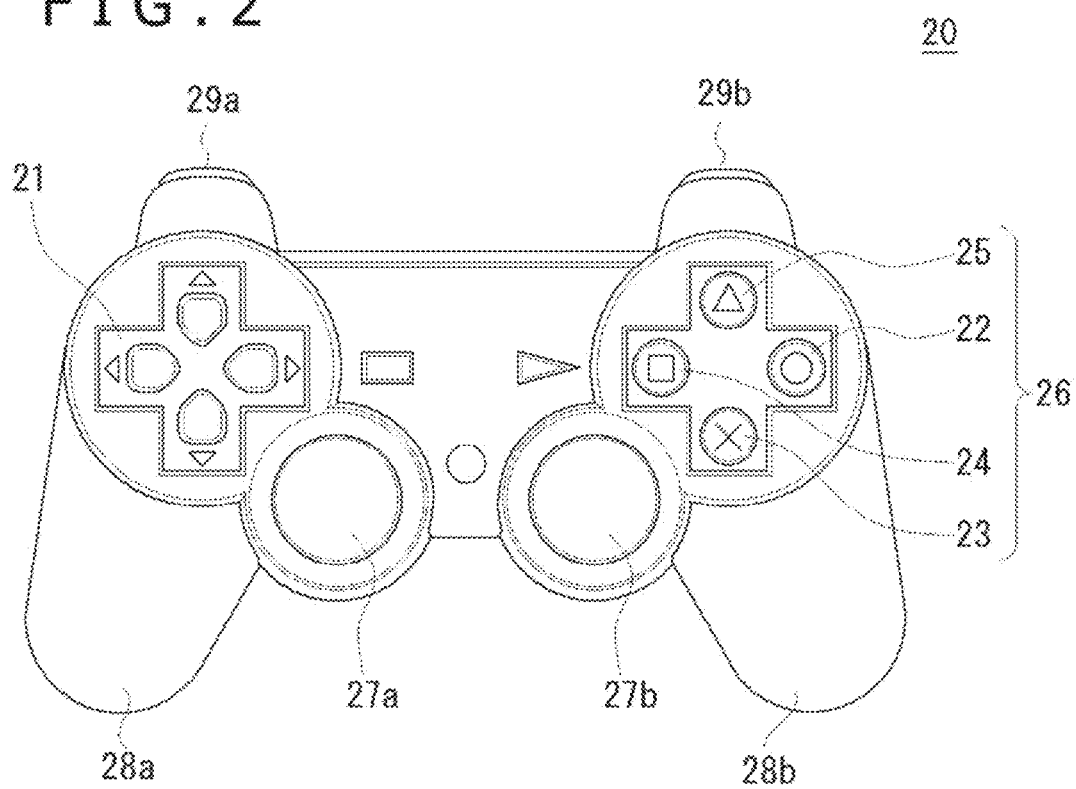
FIG. 2 is a view depicting an appearance configuration of an inputting apparatus which can be applied to the information processing system of FIG. 1.

FIG. 2 depicts an example of an appearance configuration of an inputting apparatus 20. The inputting apparatus 20 includes directional keys 21, analog sticks 27a and 27b, four different operation buttons 26, an L button 29a, and an R button 29b as operation means which can be operated by the user. The four operation buttons 26 include a circle button 22, a cross button 23, a square button 24, and a triangle button 25.

Various functions are allocated to the operation means in accordance with the processing contents to be carried out by the information processing apparatus 10. The user would operate, in a state in which the user grasps left and right handles 28a and 28b with the left and right hands, respectively, the operation means described above to input a starting or ending request for information processing or a requesting signal for a content being processed.

To some of the operation means, a function of inputting a request for enlarging/reducing a display image and a function of inputting a request for scrolling in the upward, downward, leftward or rightward direction are allocated. For example, the function of inputting a request for enlarging/reducing a display image is allocated to the analog stick 27b on the right side. The user can input a request for reducing a display image by pulling the analog stick 27b toward the user and can input a request for enlarging the display image by pushing the analog stick 27b away from the user.

The inputting function of a scrolling request is allocated to the directional keys 21. By depressing any of the directional keys 21, the user can input a scrolling request in the direction in which the directional key 21 is depressed. It is to be noted that the inputting function of a request for moving a viewpoint may be allocated to different operation means. For example, the inputting function of a scrolling request may be allocated to the analog stick 27a. Further, as hereinafter described, functions of advancing and returning an image of a display target from among a plurality of images whose order is defined are allocated to the L button 29a and the R button 29b, respectively. Such an operation as just described is hereinafter referred to as "successive feeding operation." In FIG. 2, the L button 29a and the R button 29b are provided on an upper side face of the inputting apparatus 20 and are configured for depression toward the user by the index fingers or the like.

It is to be noted that the inputting apparatus 20 depicted in FIG. 2 is a mere example and is not restricted in terms of the shape or the function. For example, such popular inputting apparatus as a mouse, a keyboard and a touch panel or combinations of them may be applied. Further, a camera for picking up an image of the user or the like, a microphone for fetching sound and so forth may be applied as the inputting apparatus. It can be recognized sufficiently by those skilled in the art that a function can be allocated to one or a combination of general operation techniques such as, for example, clicking or dragging in the case of a mouse and tapping, double tapping, flicking and dragging in the case of a touch panel. In the present embodiment, functions of a viewpoint moving operation, a forward feeding operation and a jumping operation of a page of an electronic book hereinafter described are individually allocated to different operation techniques. Further, the information processing apparatus 10 and the inputting apparatus 20 may be integrated with each other so as to implement a portable terminal or the like.

The inputting apparatus 20 has a function of transmitting a signal in accordance with the substance of an operation by the user to the information processing apparatus 10 and is configured, in the present embodiment, for wireless communication with the information processing apparatus 10. The inputting apparatus 20 and the information processing apparatus 10 may establish a wireless connection therebetween using the Bluetooth (registered trademark) protocol, the IEEE 802.11 protocol or the like. It is to be noted that the inputting apparatus 20 may be connected to the information processing apparatus 10 through a cable and transmit an input signal to the information processing apparatus 10.

Figure 3:
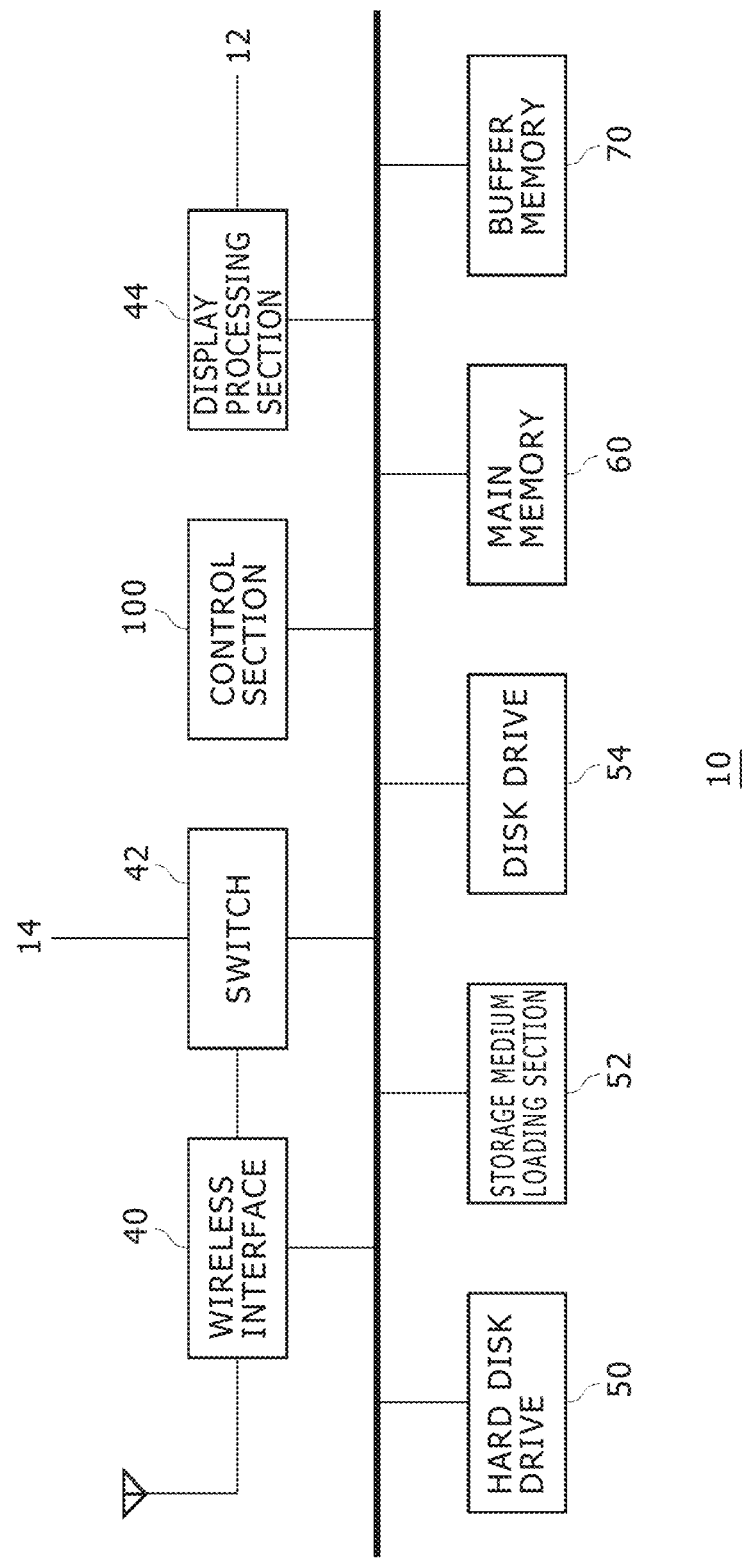
FIG. 3 is a view depicting a configuration of an information processing apparatus in the present embodiment.

FIG. 3 depicts a configuration of the information processing apparatus 10. The information processing apparatus 10 includes a wireless interface 40, a switch 42, a display processing section 44, a hard disk drive 50, a recording medium loading section 52, a disk drive 54, a main memory 60, a buffer memory 70, and a control section 100. The display processing section 44 includes a frame memory for buffering data to be displayed on the display unit of the display apparatus 12.

The switch 42 is an Ethernet switch (Ethernet is a registered trademark) and is a device connected to an external apparatus by wire or wireless connection so as to transmit and receive data. The switch 42 is connected to an external network through the cable 14 so as to transmit and receive a content file or the like from a content server. Further, the switch 42 is connected to the wireless interface 40. The wireless interface 40 is connected to the inputting apparatus 20 using a given wireless communication protocol. A signal inputted to the inputting apparatus 20 by the user is supplied to the control section 100 through the wireless interface 40 and the switch 42.

The hard disk drive 50 functions as a storage apparatus for storing data. A content file may be stored in the hard disk drive 50. If a removable recording medium such as a memory card is loaded into the recording medium loading section 52, then the recording medium loading section 52 reads out data from the removable recording medium. If a read-only ROM disk is loaded, then the disk drive 54 drives and recognizes the ROM disk and reads out data. The ROM disk may be an optical disk, a magneto-optical disk or the like. The content file may be stored in such recording media.

The control section 100 includes a multicore CPU. One general-purpose processor core and a plurality of simple processor cores are provided in the single CPU. The general-purpose processor core is called PPU (Power Processing Unit), and the remaining processor cores are called each SPU (Synergistic-Processing Unit). The control section may further include a GPU (Graphics Processing Unit).

The control section 100 includes a memory controller connected to the main memory 60 and the buffer memory 70. The PPU includes a register and further includes a main processor as an entity of calculation execution. The PPU efficiently allocates tasks as basic units of processing in applications to be executed to the SPUs. It is to be noted that the PPU may execute a task by itself. Each SPU includes a register and further includes a sub processor as an entity of calculation execution and a local memory as a local storage area. The local memory may be used as the buffer memory 70.

The main memory 60 and the buffer memory 70 are storage apparatus and are each configured as a RAM (Random Access Memory). The SPU includes a dedicated DMA (Direct Memory Access) controller as a control section and is capable of carrying out high-speed data transfer between the main memory 60 and the buffer memory 70. Further, the SPU can implement high-speed data transfer between the frame memory in the display processing section 44 and the buffer memory 70. The control section in the present embodiment implements a high speed image processing function by causing a plurality of SPUs to operate in parallel. The display processing section 44 is connected to the display apparatus 12 and outputs a result of image processing in accordance with a request from the user.

The information processing apparatus 10 of the present embodiment loads part of image data from the hard disk drive 50 into the main memory 60 in advance in order to smoothly carry out a process of moving a display area of an image to be displayed as a content. Further, the information processing apparatus 10 decodes part of the image data loaded in the main memory 60 and stores the decoded image data into the buffer memory 70 in advance. This makes it possible to instantly switch an image to be used for rendering of the display image at a later required timing.

The data structure of an image as a display target in the present embodiment is not restricted particularly. Here, however, description is given of an example wherein hierarchical image data having a hierarchical structure is used in order to make it possible to display a high definition image in a higher efficiency. Hierarchical image data is image data including images of different resolutions generated by reducing the size of an original image to a plurality of stages. An image in each hierarchy is divided into one or a plurality of tile images. For example, an image of the lowest resolution is configured from one tile image. The original image which has the highest resolution is configured from the greatest number of tile images.

Figure 4:
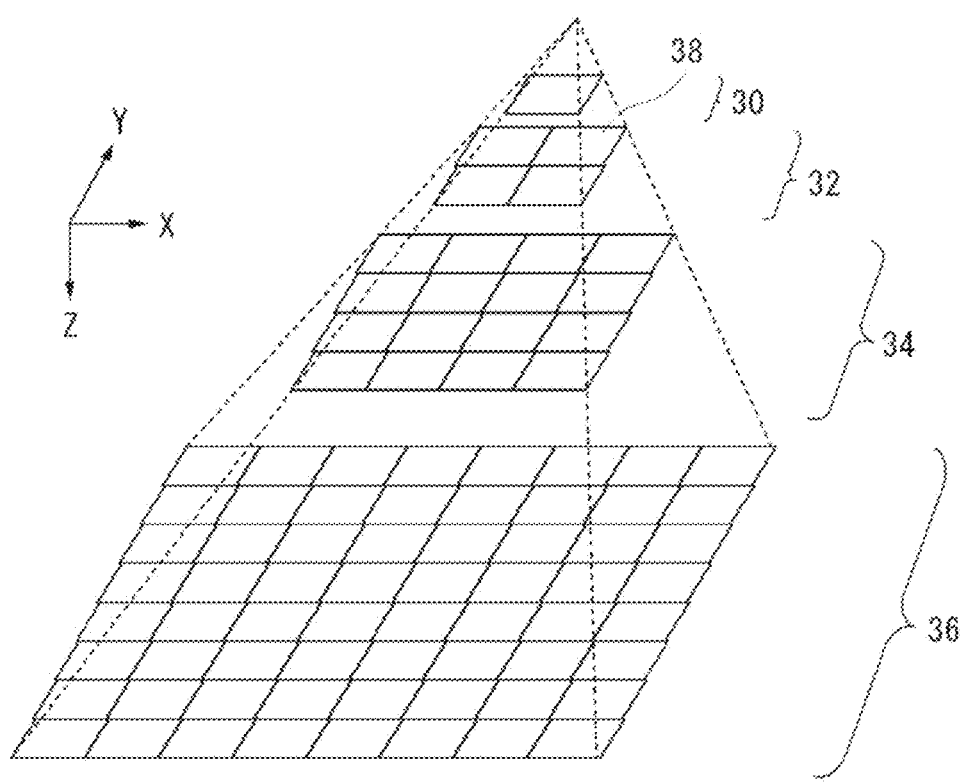
FIG. 4 is a conceptual view of a hierarchical structure of image data which can be used in the present embodiment.

When an image is displayed, enlarged display or reduced display is carried out quickly by switching a tile image used for rendering to another tile image of a different hierarchy when the display images reach a predetermined resolution. Image data having such a hierarchical structure as just described is hereinafter referred to as "hierarchical data." FIG. 4 depicts a conceptual view of the structure of hierarchical data. The hierarchical data has a hierarchical structure configured from a 0th hierarchy 30, a first hierarchy 32, a second hierarchy 34, and a third hierarchy 36 in the depthwise (Z axis) direction. It is to be noted that, although FIG. 4 depicts only four hierarchies, the number of hierarchies is not restricted to this.

The hierarchical data illustrated in FIG. 4 has a quadtree hierarchical structure. Each hierarchy is configured from one or more tile images 38. All of the tile images 38 are formed to have an equal size having an equal number of pixels and have, for example, 256×256 pixels. The image data in the hierarchies are representations of an image in different resolutions. The original image in the third hierarchy 36 having the highest resolution is reduced in a plurality of stages to generate the image data of the second hierarchy 34, the first hierarchy 32, and the 0th hierarchy 30. For example, the resolution in an Nth hierarchy (N is an integer equal to or greater than 0) may be ½ the resolution of the (N+1)th hierarchy in both of the leftward and rightward (X axis) direction and the upward and downward (Y axis) direction.

In the information processing apparatus 10, the hierarchical data are stored in a format compressed by a given compression method in a storage apparatus such as the hard disk drive 50. The hierarchical data are read out from the storage apparatus and decoded before they are displayed on the display apparatus 12. The information processing apparatus 10 according to the present embodiment has a decoding function compatible with a plurality of compression methods. For example, the information processing apparatus 10 is capable of decoding compression data of the S3TC format, JPEG format and JPEG2000 format.

As depicted in FIG. 4, the hierarchical structure of the hierarchical data is set defining the leftward and rightward direction as the X axis, the upward and downward direction as the Y axis and the depthwise direction as the Z axis and constructs a virtual three-dimensional space. The information processing apparatus 10 derives an amount of change of a display area from a viewpoint moving request signal supplied from the inputting apparatus 20. Then, the information processing apparatus 10 uses the amount of change to derive coordinates (frame coordinates) of the four corners of a frame in the virtual space. It is to be noted that the information processing apparatus 10 may derive, in place of the frame coordinates in the virtual image, information which specifies a hierarchy and texture coordinates (UV coordinates) in the hierarchy. In the following description, also a combination of hierarchy specification information and texture coordinates is referred to as frame coordinates.

Image data of the hierarchies included in the hierarchical data exist discretely with respect to the Z axis of the virtual space. Therefore, when an image is to be displayed in a scale factor between hierarchies having no image data, image data available in the proximity in the Z axis direction is used. For example, when the scale factor of a display image is in the proximity of the second hierarchy 34, the display image is produced using image data of the second hierarchy. In order to implement this, an image switching boundary is set for a resolution between hierarchies, for example, to the center between hierarchies. If the scale factor of the display image crosses the switching boundary, then image data to be used for production of a display image is switched, and the image is displayed in an expansion or reduction scale.

A frame coordinate is utilized in loading of compression data into the main memory, a rendering process of a display image and so forth. Further, a frame coordinate is utilized also for link decision hereinafter described after it is converted into frame parameters representative of a relative size and a relative position with respect to a given reference frame. A particular example of the frame parameters is hereinafter described. It is to be noted that, as described hereinabove, data of images of a display target may not have a hierarchical structure, or only some of a plurality of image data configuring the content may be hierarchical data. Image data including also hierarchical data are hereinafter referred to as "image data." Further, all processes may be carried out based on the frame parameters in place of the frame coordinates. Information representative of a size and a position of a display area in an entire image is hereinafter referred to collectively as "frame parameters."

The information processing apparatus 10 in the present embodiment has a function of switching, using it as a trigger that such a given condition that, into an area set to an image being displayed, the display area moved by a viewpoint moving operation of the user is included, the display target to a different image associated in advance with the set area. Such switching between images is hereinafter referred to as "link," and a set region which triggers generation of a link is hereinafter referred to as "link area."

Figure 5:
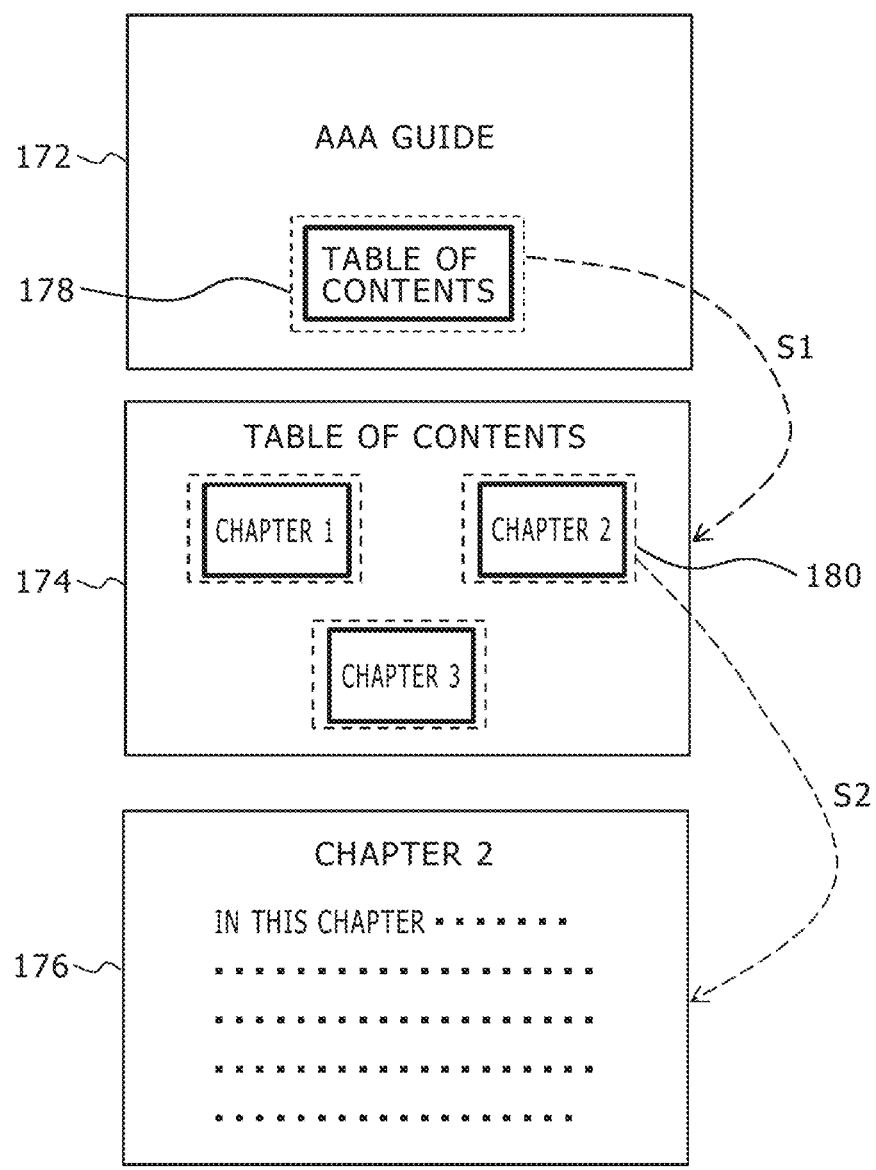
FIG. 5 is a view depicting an example of an image which is switched by a link when an electronic book is a content in the present embodiment.

FIG. 5 depicts an example of an image switched by a link where an electronic book is a content. Generally, a book is configured from a plurality of factors such as a cover, a table of contents, a text and an index. Here, the cover or a title described on the cover is utilized for selection of the book. Further, the table of contents and the index are utilized for accessing to text pages on which desired information is described. Also in media other than the book, desired information can be reached efficiently usually by following classifications of information such as a large classification, a middle classification and a small classification. The content in the present embodiment implements such an access route to information by link setting on an image.

In the example of FIG. 5, a top stage represents an image 172 of the cover, a middle stage represents an image 174 of the table of contents, and a bottom stage represents an image 176 of a text page. Each broken line rectangle in the images represents a set link area but does not appear on an actual image. A link area 178 is set to the cover image 172, and in order to indicate that a link area to the table of contents is available, a rectangle in which a character string of "Table of contents" is described is represented as an image.

If, while the image 172 is displayed, the user moves the viewpoint thereof so as to zoom in the link area 178 and such a given condition that the display area is included in the link area 178 is satisfied, then the display is switched to the image 174 of the table of contents set in advance to the link area 178 (arrow mark S1). To the image 174 of the table of contents, three link areas corresponding to items of the table of contents are set. In the link areas, rectangles in which character strings of "Chapter 1," "Chapter 2" and "Chapter 3" which represent items of the table of contents are individually represented as images.

Then, for example, if a link area 180 of the "Chapter 2" is zoomed in and the display area satisfies the given link condition, then the display is switched to the image 176 of a text page of the "Chapter 2" set in advance to 180 the link area (arrow mark S2). If the unique property that the image of the display target is switched in response to a moving operation of the viewpoint in this manner and the image to be displayed, for example, in the link area 180 is a thumbnail image of the image 176 of the text page, then a seamless image representation with which no change in image occurs across the switching can be implemented. Furthermore, depending upon the substance of the content, the link destination may be a video or may be a combination of a still picture and a video.

Further, it is made possible to follow the link described above reversely by given operation means such as the cross button 23 of the inputting apparatus 20. Such an operation as just described is hereinafter referred to as "link returning operation." For example, if a link returning operation is carried out in a state in which, for example, the image 176 of the text page is displayed, then the image is switched using the link area 180 in the image 174 of the table of contents as the display area. If a link returning operation is carried out again, then the image is switched using the link area 178 of the image 172 of the cover as the display area. The function of the link returning operation may be allocated to one of the buttons such as the cross button 23, or a viewpoint moving operation may be utilized for the function similarly as upon execution of a link. For example, the display may be switched to an image of the link source using it as a trigger that an entire image is displayed when a displayed image is zoomed out.

It is to be noted that, although, in the example described above, the display is switched to an image of the link destination using it as a trigger that the display area and the link area come to satisfy the given condition by a viewpoint moving operation, a rectangular area represented in the inside of a link area may be configured for direct selection. For example, by moving a target for emphasized display from among selectable rectangular areas by one of the directional keys 21 of the inputting apparatus 20 and then determining the selected rectangular area by the circle button 22 or the like, the display image may be switched to the image of the link destination associated with the rectangle.

Further, the mechanism is not restricted particularly only if the mode in which switching to a different image is carried out in response to an operation for an area on an image being displayed is implemented.

If a link is set in such a manner as described above, then it becomes possible to efficiently carry out accessing from the cover to a text page by a viewpoint moving operation. On the other hand, in order to access to a page the user wants to read, two routes of different directions including a route along which a book, a table of contents and a page are followed in this manner and another route along which pages are followed successively or a route of a combination of the two routes may be applied. Therefore, in the present embodiment, in addition to image switching by a link, an order is defined for images and image switching for forward feeding in accordance with the order is carried out. For example, if the "Chapter 2" of a text page in the example of FIG. 5 extends over a plurality of pages, then the image 176 which can be reached by a link from the image 174 of the table of contents is determined as the first page of the "Chapter 2" and succeeding pages are switched by a forward feeding operation.

Figure 6:
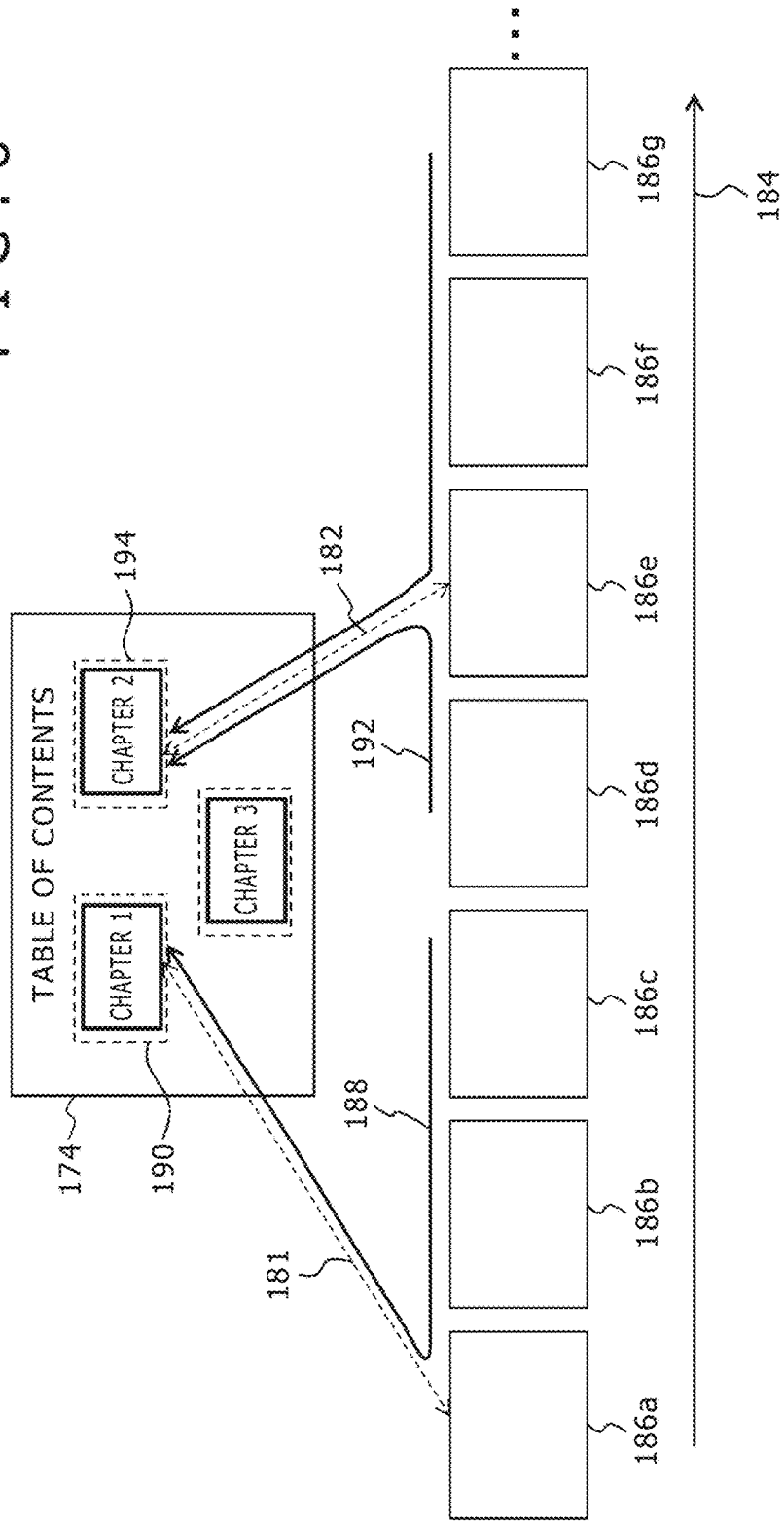
FIG. 6 is a view illustrating a relationship between switching by a link and switching by a forward feeding operation in the present embodiment.

FIG. 6 is a view illustrating a relationship between switching by a link and switching by a forward feeding operation. An image 147 corresponds to the image 174 of the table of contents of FIG. 5. Rectangles arrayed at the lower stage individually indicate images 186a, 186b, 186c, ... of text pages. As described hereinabove, a link area 190 of the "Chapter 1" in the image 174 of the table of contents has a link destination (arrow mark 181) at the image 186a representative of the first page of the chapter 1 of the text pages. A link area 194 of the "Chapter 2" in the image 174 of the table of contents has a link destination (arrow mark 182) at the image 186a representative of the first page of the chapter 2. It is to be noted that the image 186e corresponds to the image 176 of FIG. 5.

Further, for the images 186a, 186b, 186c, ... of the text pages, an order is defined in order of the pages thereof (arrow mark 184). In particular, numbers may be applied in an ascending order to the identification information of the images or the images may be listed in order described in accordance with the order, or each image may have additional information provided thereto as identification information of the preceding and succeeding images. Thus, for example, when the user advances reading to the chapter 2 after the image 186e of the first page of the "Chapter 2" is reached by the switching route by the link illustrated in FIG. 5, the display is successively switched to the images 186f, 186g, ... by such an operation as to depression of the R button 29b of the inputting apparatus 20. When the user returns reading to the preceding page, the L button 29a is operated.

By defining an order such that all images of the text pages are penetrated irrespective of whether or not an image is a link destination from the image 174 of the table of contents, the text page can be advanced and returned freely irrespective of the chapters. As a result, the degree of freedom in access route to each page increases. Here, when the accessing is to return from an image (image 186b, 186c, 186d or the like) of a text page which is not a link destination from the image 174 of the table of contents to the image 174 of the table of contents, basically the pages are successively searched in the preceding direction so as to reversely follow the defined order. Then, the display is switched to an image of a link source of an image set as a link destination and detected first.

For example, if a link returning operation is carried out during display of the image 186c of a text page, then the arrow mark 184 is followed reversely. Then, from the image 186a set as a link destination and detected first in the reverse search, the display is switched to the link area 190 of the image 174 which is the link source (arrow mark 188). Where such a procedure as just described is applied, if a link returning operation is carried out, for example, midway of the chapter 1, then the display returns to the "Chapter 1" of the table of contents. Consequently, the position at present in the information system can be grasped readily. As a result, a guideline for determination of to which area the display image is to be moved next can be obtained.

However, in such a case that, when a link returning operation is carried out after reading is advanced to the image 186d of the last page of the "Chapter 1," if the "Chapter 2" following the "Chapter 1" which has been read already is to be displayed preferentially, the images may be searched in the succeeding direction of the defined order. In this case, when the link returning operation is carried out at the image 186d, the arrow mark 184 is followed in the forward direction. Then, the display is switched from the image 186e set as a link destination and detected first in the forward search to the link area 194 of the image 174 which is a link source (arrow mark 192). In which direction the defined order is to be followed in a search can be set by the content producer taking the substance of the content and so forth into consideration. It is to be noted that the definition of an order can be set not only for end images of text pages or the like but also for an image of a link source such as an image of the table of contents.

Figure 7:
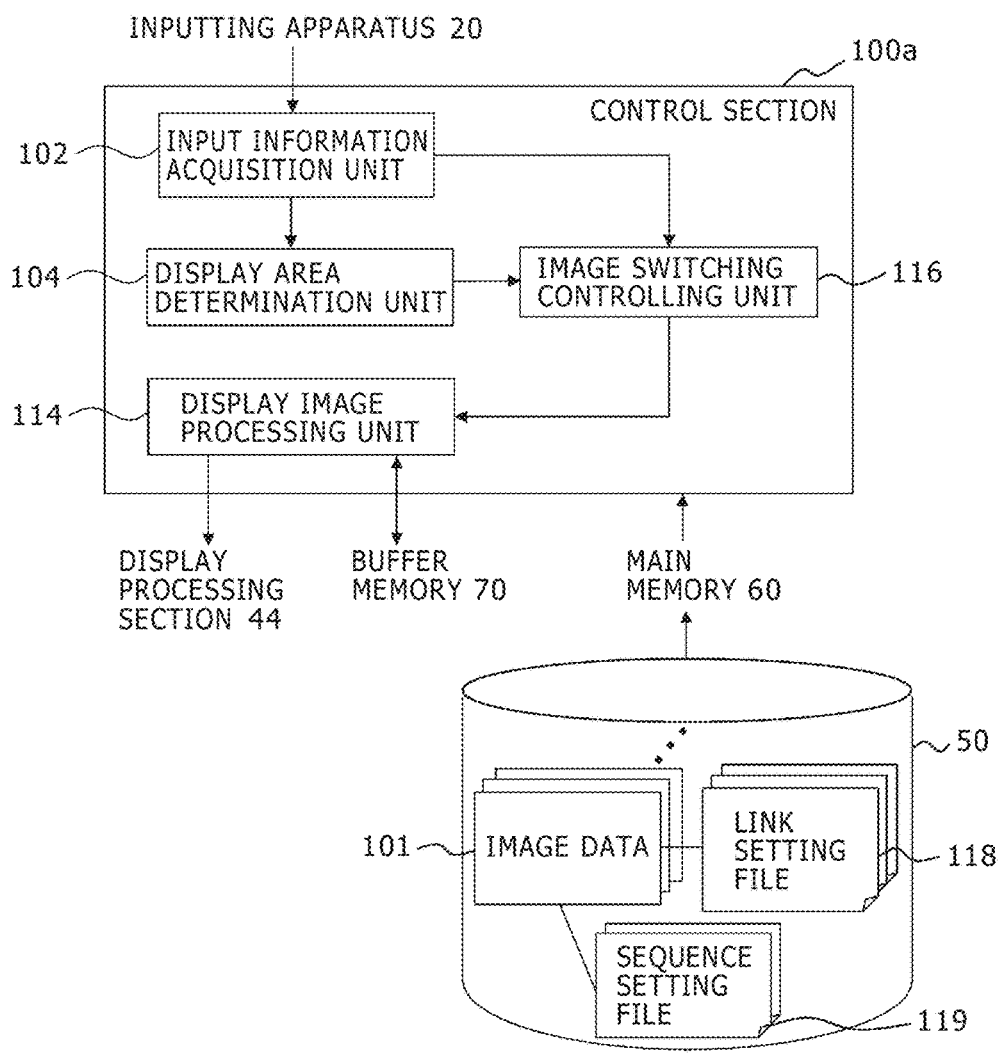
FIG. 7 is a view particularly depicting a configuration of a control section having a function of displaying an image of a content in the present embodiment.

FIG. 7 particularly depicts a configuration of a control section 100a having such a function for displaying images of a content as described above. The control section 100a includes an input information acquisition unit 102, a display area determination unit 104, an image switching controlling unit 116, and a display image processing unit 114. The input information acquisition unit 102 acquires information inputted from the inputting apparatus 20 by a user. The display area determination unit 104 determines an area to be displayed newly. The image switching controlling unit 116 decides whether or not it is necessary to switch an image of a display target through a link or a forward feeding operation. The display image processing unit 114 renders an image of a display area to be displayed newly.

Figure 13:
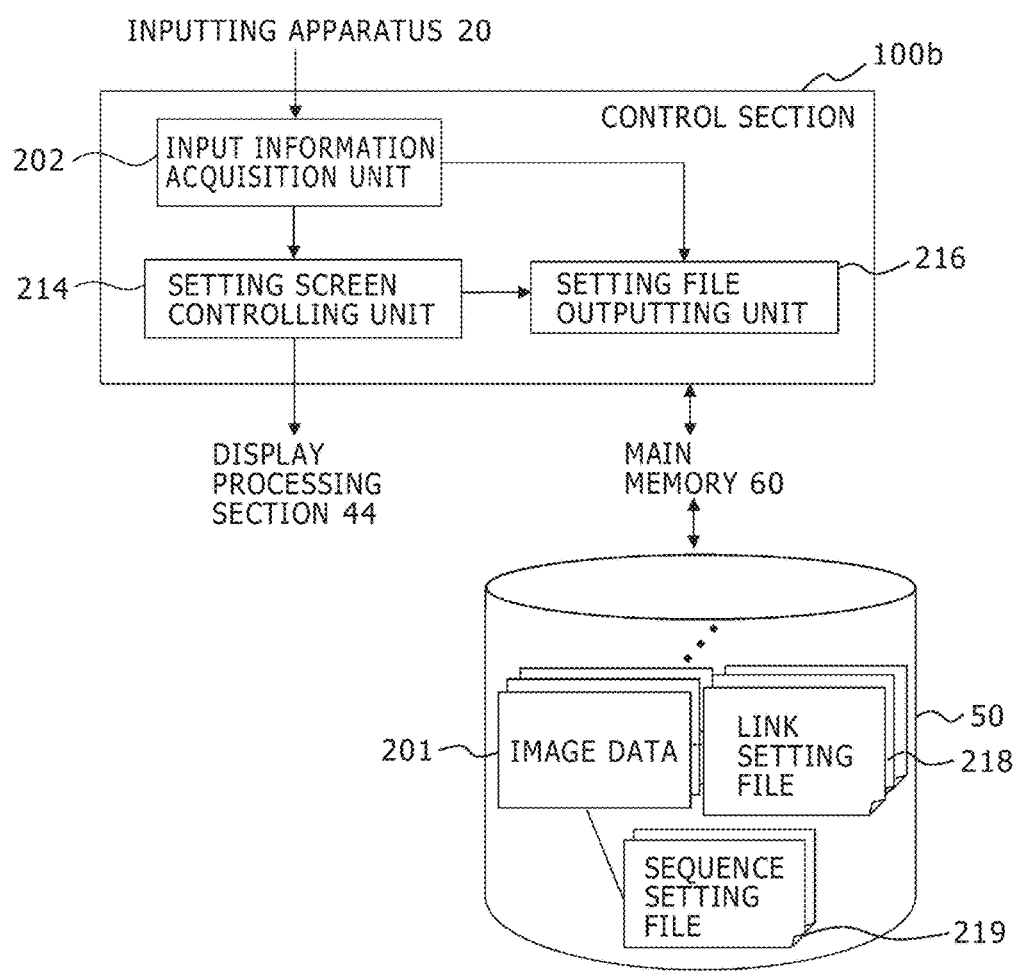
FIG. 13 is a view particularly depicting a control section of an information processing apparatus having a function of supporting production of a content in the present embodiment.

In FIG. 7 and FIG. 13 which is hereinafter described, elements described as functional blocks which carry out various processes can be implemented, in hardware, from a CPU (Central Processing Unit), a memory or some other LSI and, in software, from a program loaded in the memory. As described hereinabove, the control section 100 includes one PPU and a plurality of SPUs, and the PPU and the SPUs can configure the functional blocks singly or in cooperation. Accordingly, it is recognized by those skilled in the art that the functional blocks can be implemented in various forms from only hardware, only software or a combination of hardware and software, but are not limited to any of them.

First, image data 101 of images to be incorporated in display as contents, link setting files 118 in which information of links are described and sequence setting files 119 which define orders of images whose forward feeding operation is to be accepted are stored as content files into the hard disk drive 50. The link setting files 118 are produced for individual images for which a link area is to be set and are associated with the image data 101. The sequence setting files 119 are produced individually for a plurality of image sets between which an order is defined and are associated with the image data 101 included in the image sets.

In each link setting file 118, a link area to be set to each image, a link condition and identification information of an image of a link destination by the link are described in an associated relationship with each other. Where the link destination is part of an image, the area information of the link destination is associated further. In each sequence setting file 119, identification information of images is described in a defined order, and a searching direction upon a link returning operation is described for each image. Further, for an image set as a link destination from a different image, information representing this is described. The image data 101, link setting files 118 and sequence setting files 119 are loaded into the main memory 60 at a given timing.

The input information acquisition unit 102 acquires the substance of an operation performed for the inputting apparatus 20 by the user such as an operation for starting/ending of image display, viewpoint movement, forward feeding of images or link returning. Then, the input information acquisition unit 102 suitably notifies the display area determination unit 104 and the image switching controlling unit 116 of the substance of the operation. The display area determination unit 104 determines a display area at a next point of time from the display area at present and a movement amount based on a viewpoint moving request inputted by the user. Then, the display area determination unit 104 notifies the image switching controlling unit 116 of the determined display area. Here, the "next point of time" is a timing after a display updating period based on the frame rate or the like.

The image switching controlling unit 116 reads out the link setting file 118 loaded in the main memory 60 and corresponding to image data being displayed and decides whether or not the display area at the next point of time satisfies the link condition. If the link condition is satisfied, then the link is determined as valid, and the image switching controlling unit 116 acquires identification information of image data of a link destination set in association with the link area and area information of the link destination from the link setting file 118.

Further, if a notification that a forward feeding operation for images has been carried out is received from the input information acquisition unit 102, then the image switching controlling unit 116 reads out the sequence setting file 119 defined for an image set which includes the image being displayed and specifies identification information of the next image data. On the other hand, if a notification that a link returning operation has been carried out is received from the input information acquisition unit 102, then the image switching controlling unit 116 searches the definition order in the sequence setting file 119 in the set direction to specify an image set as a link destination. Then, the image switching controlling unit 116 specifies identification information and a link area of the image data of the link source of the specified image.

It is to be noted that, in order to obtain information of the image of the link source from the image set as the link destination, image data of the link destination and the link setting file 118 are associated with each other in advance so that the link setting file 118 associated with the image data of the link source can be reversely looked up. Or, also a process for following a link reversely may be positioned as one of links while a link setting file in which image data of the "link destination" is set as a link source is prepared separately. Anyway, the image switching controlling unit 116 notifies the display image processing unit 114 of information relating to an image after switching acquired by such procedures. When there is no necessity to carry out image switching, a notification of information of a display area at the next point of time is issued directly to the display image processing unit 114.

The display image processing unit 114 loads, on the basis of the information received from the image switching controlling unit 116, compression image data necessary for rendering of a new display area from the hard disk drive 50 into the main memory 60 as occasion demands. When the new image data 101 is to be loaded, also the link setting file 118 associated with the image data 101 is loaded. Further, when the sequence setting file 119 including the image is not loaded as yet, also the sequence setting file 119 is loaded. Then, the display image processing unit 114 decodes the compression image data loaded therein and then renders an image of the display area in the frame memory of the display processing section 44.

By decoding data of an image of a wide range including the display area and storing the decoded data into the buffer memory 70 in advance, later display area updating can be carried out smoothly. Further, if also the data of the image displayed before the switching of the display image is left stored in the buffer memory 70, then a process for restoring the preceding display image can be carried out rapidly. The display processing section 44 suitably outputs the image rendered in the frame memory to the display apparatus 12 so that an image is displayed based on a viewpoint movement or an image switching operation.

Figure 8:
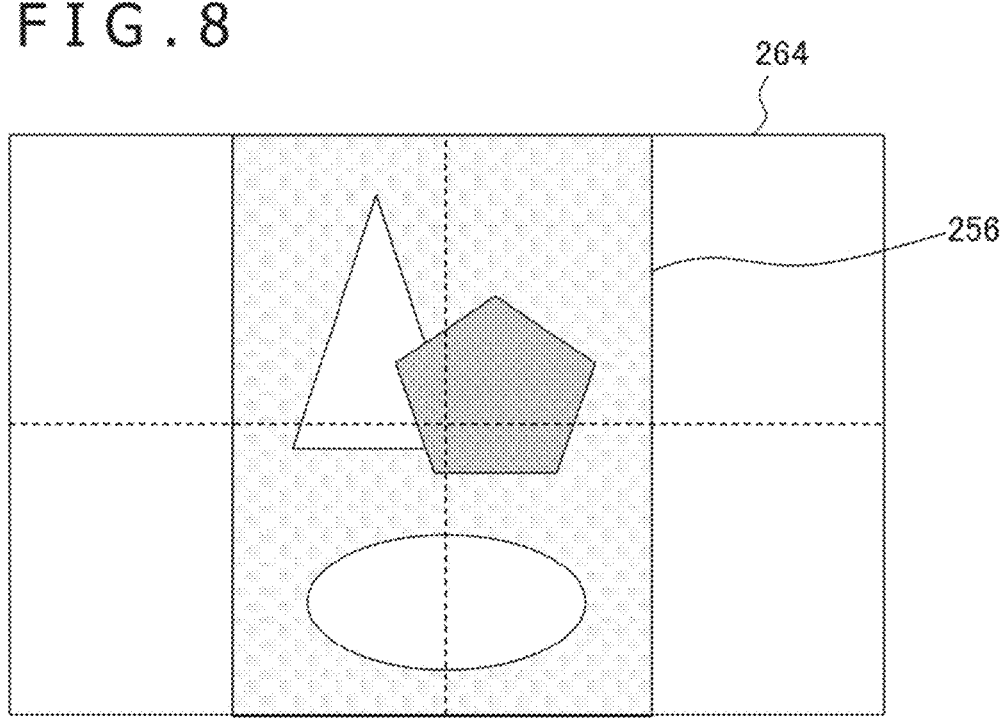
FIG. 8 is a view illustrating a positional relationship between an area which is a reference for a frame parameter and an image in the present embodiment.
Figure 9:
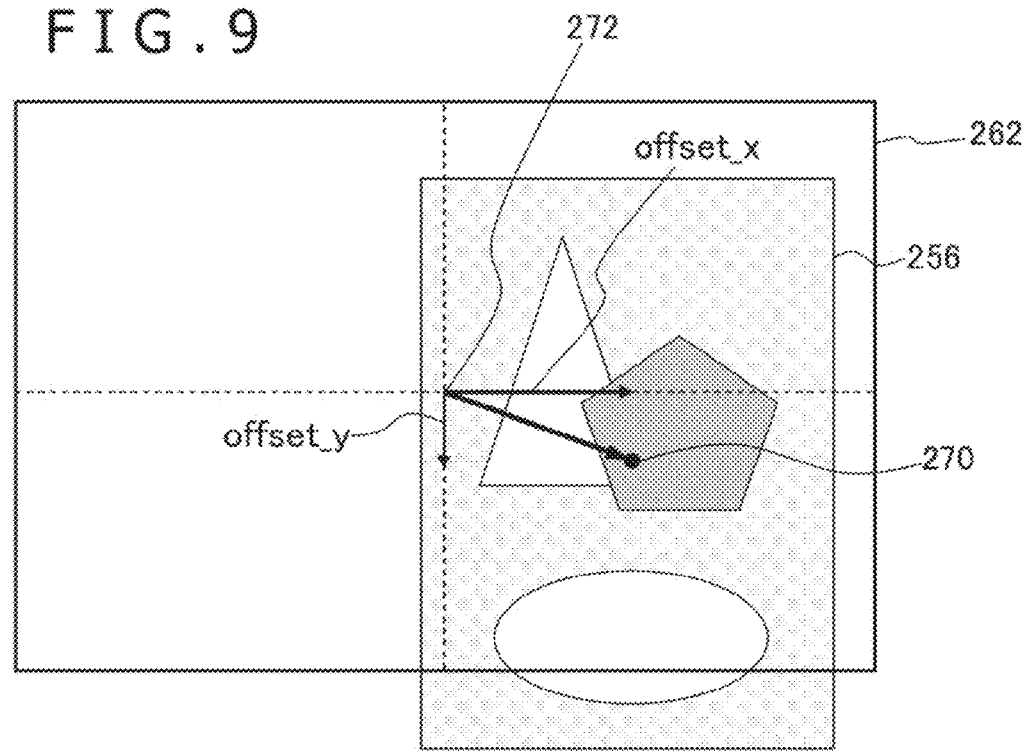
FIG. 9 is a view illustrating a frame parameter of an area in which a reference frame is moved on an image plane in the present embodiment.
Figures 10, 11:
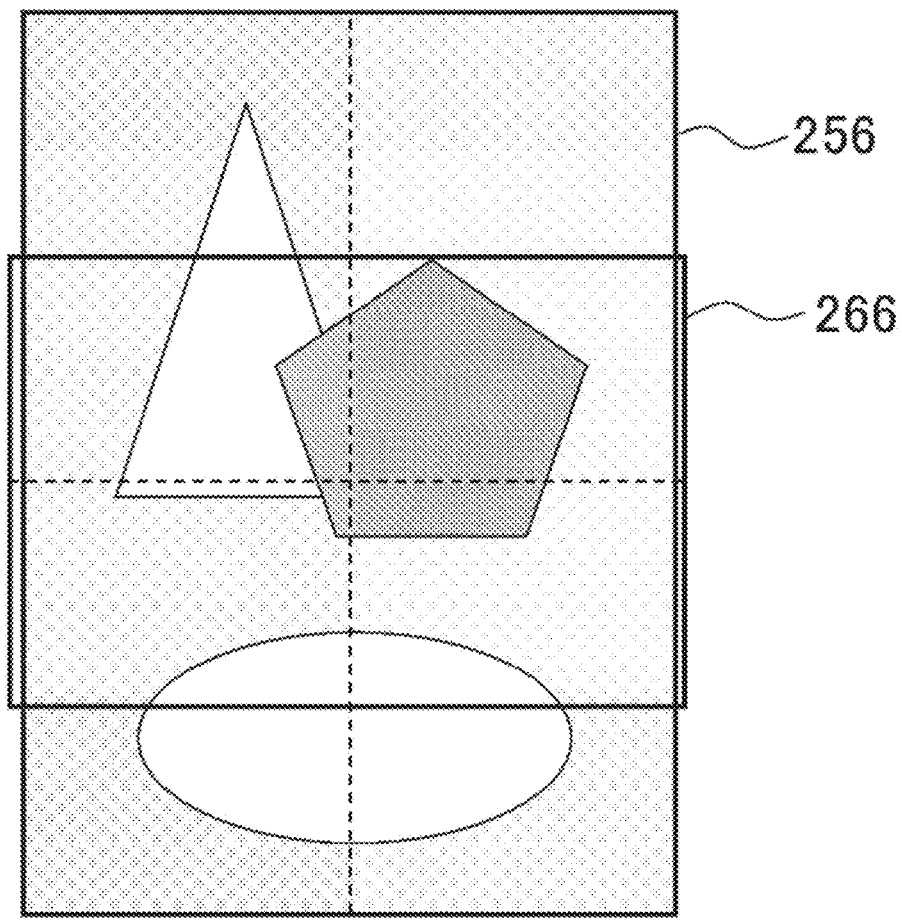
FIG. 10 is a view illustrating a frame parameter of an area in which an enlargement factor is changed without moving the reference frame on the image plane in the present embodiment.
FIG. 11 is a view illustrating an example of a data structure of a link setting file described using a frame parameter in the present embodiment.

Now, an example of setting of the link setting file 118 is described. FIGS. 8 to 10 are views illustrating a definition of a frame parameter used in the link setting file 118. The frame parameter is a parameter representative of an area of a display target on an image plane and is used for setting of a link area or an area which is to be displayed after switching in an image of a link destination.

FIG. 8 illustrates a positional relationship between an area used as a reference for the frame parameter and an image. Referring to FIG. 8, a reference frame 264 for an image 256 is a rectangle which has a center same as the center of the image 256, circumscribes the image 256 and has an aspect ratio of a given value. Here, the aspect ratio may have a given value and is, for example, equal to the aspect ratio of the display unit used for display or of the display area of the display unit. It is assumed that, even if the display image is enlarged or reduced, the set area normally has the ratio.

The position and the magnitude of the area are represented by the frame parameter including three parameters of a horizontal offset, a vertical offset and an enlargement factor when each of the horizontal side and the vertical side of the reference frame 264 is represented by 1. In particular, a coordinate system unique to the image 256 is determined based on the reference frame 264. The frame parameter of the reference frame 264 itself is (horizontal offset, vertical offset, enlargement factor)=(0, 0, 1.0).

FIG. 9 is a view illustrating the frame parameter in an area in which the reference frame is moved on the image plane. In this instance, a value is substituted into each of the parameters of the vertical offset and the horizontal offset. In particular, a horizontal component offset_x and a vertical component offset_y of a distance from a center 272 of the area to a center of the image 256, namely, to a center 270 of the reference frame, are values of the horizontal offset and the vertical offset, respectively. Accordingly, an area 262 is represented as (offset_x, offset_y, 1.0).

FIG. 10 is a view illustrating the frame parameter of an area in which the enlargement factor is changed without moving the reference frame on the image plane. In this instance, the area ratio of an area 266 to the reference frame is substituted into the parameter of the enlargement factor. If the area 266 of FIG. 10 is 0.5 times the area of the reference frame 264 of FIG. 8, then the area 266 is represented as (0, 0, 0.5).

FIG. 11 illustrates an example of a data structure of a link setting file described using the frame parameter. In a link setting file 300, one row corresponds to one link, namely, to switching from corresponding image data to different image data. The link setting file 300 is configured from four different fields including a link source image frame field 302, a valid scale range field 304, a link destination file field 306 and a link destination image frame field 308.

The link source image frame field 302 designates a link area to be set on a corresponding image with the frame parameter described above. The valid scale range field 304 designates an inclusion relationship between a link area and a display area when the link is valid. In particular, when the value of the valid scale range field 304 is in the positive, if the display area includes the link area, then the link is determined as valid. When the value is in the negative, if the link area includes the display area, then the link is determined as valid.

In the first row of FIG. 11, the valid scale range field 304 has a positive value, and therefore, switching of an image is carried out in a direction in which the screen image is zoomed out to enlarge the display area. Such setting is carried out, for example, when the image 174 of the table of contents of FIG. 5 is zoomed out to carry out switching to the image 172 of the cover. Meanwhile, in the second row of FIG. 11, since the valid scale range field 304 has a negative value, switching of an image is carried out in a direction in which the screen image is zoomed in to reduce the display area. Such setting is carried out, for example, when the link area 180 in the image 174 of the table of contents of FIG. 5 is zoomed in to carry out switching to the image 176 of a text page.

The link destination file field 306 designates identification information of image data of the link destination. If this is applied to setting to the image 174 of the table of contents of FIGS. 5 and 6, then an image "R" in the first row corresponds to the cover image 172, and images "p1," "p5" and "p9" in the second to fourth rows correspond to images of the first page of the chapter 1, chapter 2 and chapter 3 from among images of the text pages, respectively. The link destination image frame field 308 designates the display area after the switching of the image of the link destination, namely, the area in which an image is to be displayed first upon execution of the link in an image designated by the link destination file field 306 using the frame parameter for the image.

Figure 12:
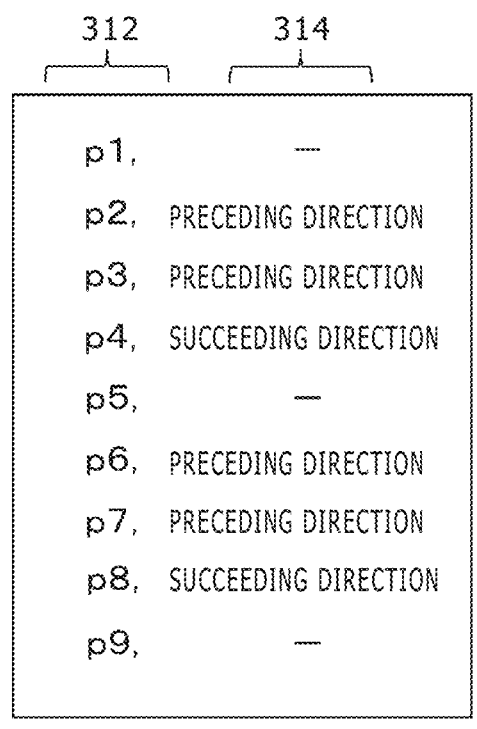
FIG. 12 is a view illustrating an example of a data structure of a sequence setting file in the present embodiment.

FIG. 12 depicts an example of a data structure of a sequence setting file. The sequence setting file 310 includes an order field 312 and a searching direction field 314. In the order field 312, identification information of images is described in a defined order. In the example of FIG. 12, an order of the images is defined in an order of the identification information of "p1," "p2," "p3," . . . and, "p9." In the searching direction field 314, a direction in which an image set as a link destination is to be searched when a link returning operation is carried out during display of an image whose identification information is described in the order field 312 is designated.

In FIG. 12, the "preceding direction" is a direction in which the defined order is followed reversely, and the "succeeding direction" is a forward direction of the defined order. If the identification information of the images 186a, 186b, 186c, . . . and, 186g of the text pages depicted in FIG. 6 is represented by "p1," "p2," "p3," . . . and, "p7," respectively, then the searching directions in FIG. 12 have a setting same as that given by the arrow marks 188 and 192 depicted in FIG. 6. Therefore, it is assumed that images whose identification information is "p1" and "p5" are set as images of a link destination from the image 174 of the table of contents like the images 186a and 186e in FIG. 6.

In this case, by describing information of invalidity such as "-" into the searching direction field 314 with regard to the images described above, it is indicated that the images are set as a link destination from a different image. Consequently, for example, if a link returning operation is carried out while the image of the identification information of "p3" is displayed, then a search is carried out in the "preceding direction," and the image of the identification information of "p1" is detected by the search. Thus, the display can be returned to an image whose link destination is the detected image.

As described above, if a content wherein an image is switched in accordance with a link setting or an order setting is implemented, then while accessing to desired information is facilitated, it may possibly occur that production of the setting files becomes a burden on the content producer. As the number of images to be incorporated into a content increases and as it is tried to display the images more efficiently, the relationship among the images is complicated and the number of setting files to be produced increases. As a result, in actual display, such a situation that switching quite different from intended switching is carried out at the stage of setting may possibly occur.

Therefore, in the present embodiment, it is made possible to produce, while actual display is imaged, a setting file to support production of a content. An apparatus for supporting production of a content in the present embodiment can be implemented with a configuration same as that of the information processing apparatus 10 in the information processing system 1 depicted in FIGS. 1 and 3. FIG. 13 particularly depicts a configuration of a control section 100b of the information processing apparatus 10 having the function of supporting production of a content in the present embodiment. It is to be noted that the control section 100b may be included in one information processing apparatus 10 together with the control section 100a depicted in FIG. 7 and having a function for displaying an image of a content. The control section 100b may otherwise be included solely in the information processing apparatus 10 so as to implement a content production supporting apparatus. Further, the control section 100a having a function for displaying an image of a content may additionally include only a function of a setting screen controlling unit hereinafter described as a function for confirming a configuration of a content.

The control section 100b includes an input information acquisition unit 202, a setting screen controlling unit 214, and a setting file outputting unit 216. The input information acquisition unit 202 acquires setting information inputted from the inputting apparatus 20 by a content producer. The setting screen controlling unit 214 controls a setting screen image. The setting file outputting unit 216 describes and outputs a final setting file. Into the hard disk drive 50, at least image data 201 to be incorporated as a content is stored. The image data 201 corresponds to the image data 101 illustrated in FIG. 7. Further, the control section 100b produces such a link setting file 218 as illustrated in FIG. 11 in advance and stores the link setting file 218 in an associated relationship with the image data 201 of the link source in advance. Further, a sequence setting file 219 produced previously may be stored into the main memory 60.

The input information acquisition unit 202 acquires information of a setting inputted by the user and relating to selection of an image and associations between images. The input information acquisition unit 202 notifies the setting screen controlling unit 214 and the setting file outputting unit 216 suitably of the acquired setting information. The setting screen controlling unit 214 associates thumbnail images of different images with each other using graphics such as lines or rectangles to render an image illustrating the set relationships between the images. The rendered images are outputted to the frame memory of the display processing section 44 so as to be displayed on the display apparatus 12. When the user carries out inputting for determining the setting, the setting file outputting unit 216 acquires the input from the input information acquisition unit 202 and writes out the input as the sequence setting file 219.

The written out sequence setting file 219 is outputted to the hard disk drive 50. Thereupon, by associating the sequence setting file 219 with the image data 201 of a plurality of images among which an order is defined by the sequence setting file 219, such a content as described above can be produced. It is to be noted that, if a sequence setting file 219 produced previously is stored in the hard disk drive 50, then the setting file outputting unit 216 may update the sequence setting file 219 in response to an input by the content producer. The setting file outputting unit 216 may further update the link setting file 218.

FIGS. 14 to 19 depict an example of a screen image rendered by the setting screen controlling unit 214. In the present embodiment, a mode is applied in which a correlation map in which a correlational relationship of a plurality of images to be incorporated in a content is represented using thumbnail images and a graphic is displayed on a setting screen so that a content producer progresses the setting while watching the setting screen. Such a setting screen as just described is hereinafter referred to as "map view." Basically, in the map view, an image produced by adding, to a thumbnail image that is a reduced image of an image to be incorporated in a content, identification information of the image is used as a unit in processing.

Figure 14:
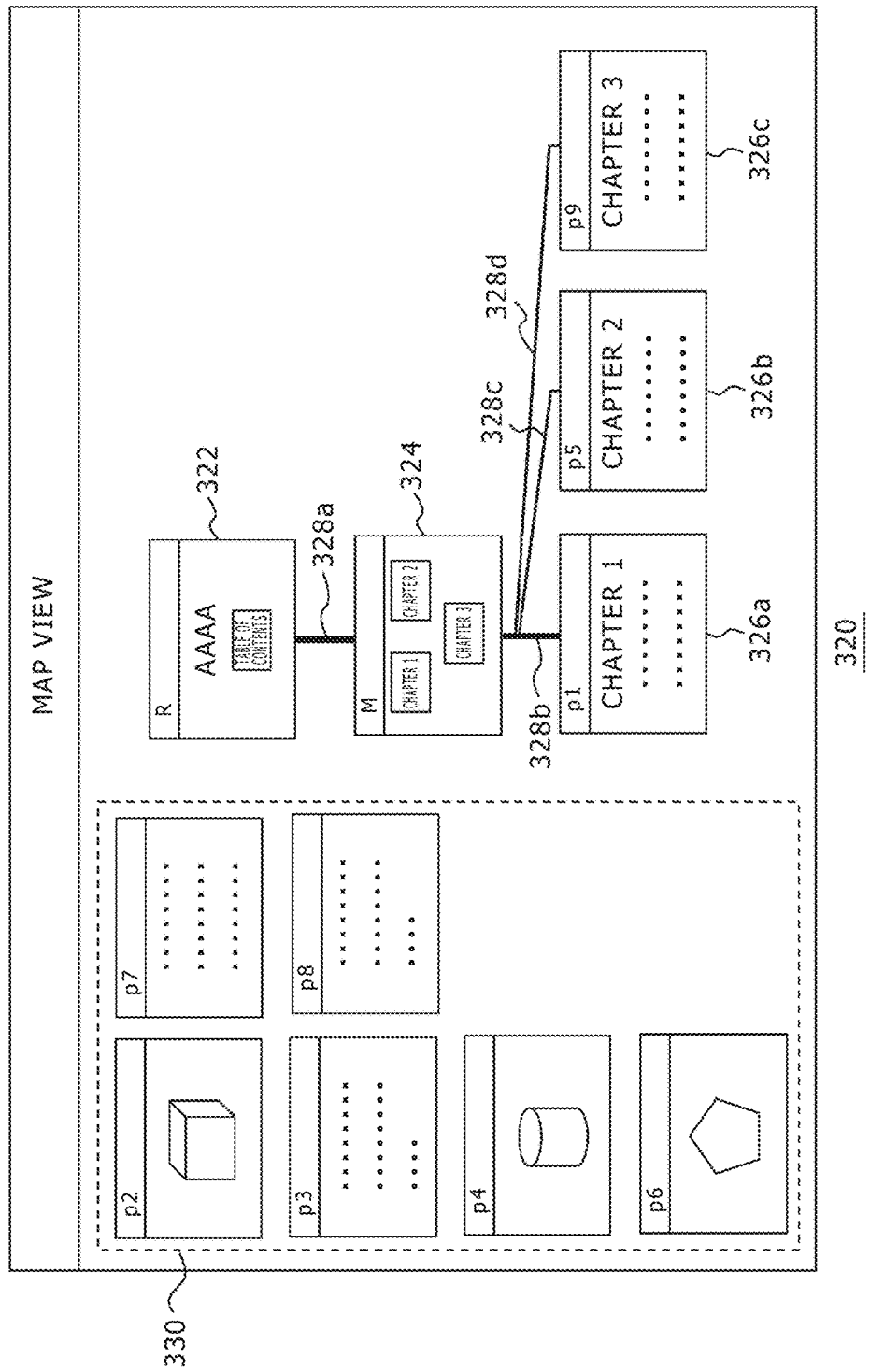
FIG. 14 is a view depicting an example of a screen image rendered by a setting screen controlling unit in the present embodiment.

First, a map view 320 of FIG. 14 is placed into an initial state in which such a link as depicted in FIG. 5 is set in advance by the link setting file 218 while a sequence setting file is not produced. In particular, an image 322 whose identification information is "R" is an image of a cover, and an image 324 whose identification information is "M" is an image of a table of contents. Further, images 326a, 326b and 326c whose identification information is "p1," "p5" and "p9," respectively, are images of a first page of "chapter 1," "chapter 2" and "chapter 3" in pages of a text, respectively. Links from the image 322 of the cover to the image 324 of the table of contents and from the image 324 of the table of contents to the images 326a, 326b and 326c of the text pages are described in the link setting file 218 associated with the image data 201 of the respective link sources. In such a case as just described, a thumbnail image of the image of each link source and another thumbnail image of the image of each link destination are connected to each other by a line as illustrated in FIG. 14. In FIG. 14, the image 322 and the image 324 are connected to each other by a line 328a, and the image 324 and the images 326a, 326b and 326c are connected to each other by lines 328b, 328c and 328d, respectively. It is to be noted that, in addition to connection of thumbnail images of images to each other by a line, any technique may be applied such as enclosure of thumbnails by a line or direct coupling of thumbnail images to each other only if an associated relationship of images before and after switching by a link is represented.

Where information represented by images has a hierarchical structure like that of a cover, a table of contents and a text page of a book, a high-low relationship of hierarchies and a high-low relationship of dispositions of thumbnail images in a map view are made coincide with each other. The map view 320 further includes a non-setting image column 330 for displaying, in a table, thumbnail images of images which are not set as a link source nor set as a link destination. In the map view 320, thumbnail images of six images having identification numbers "p2," "p3," "p4," "p6," "p7" and "p8" are displayed.

Figure 15:
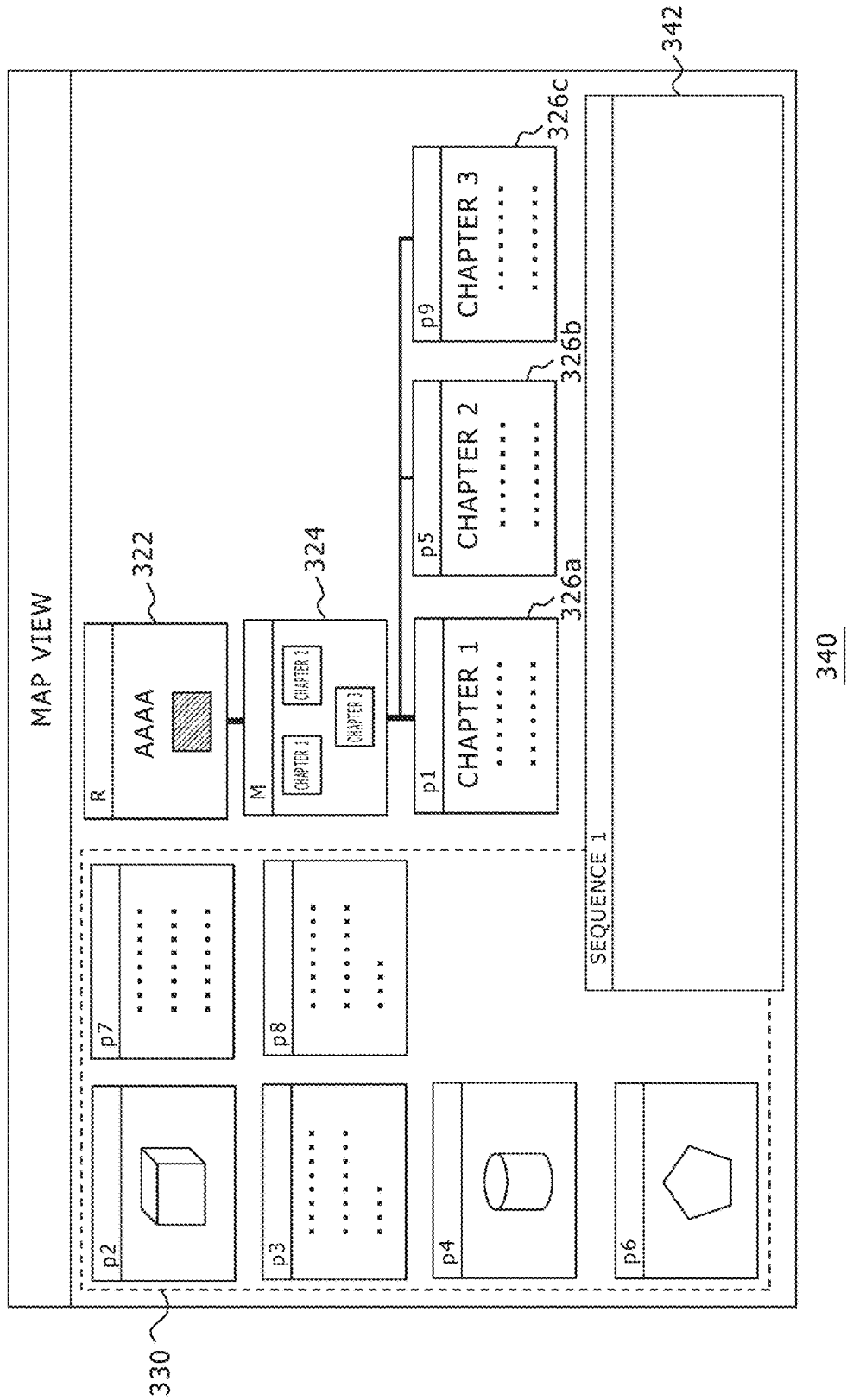
FIG. 15 is a view depicting another example of a screen image rendered by the setting screen controlling unit in the present embodiment.

The images to be displayed in the non-setting image column 330 may be all of the images whose image data are stored in the hard disk drive 50 or may be those selected separately on a selection screen image by the user. If, in a state in which the map view 320 is displayed, the content producer carries out inputting for displaying a menu window not depicted and then instructing to start production of a sequence setting file, then a map view 340 of FIG. 15 is displayed. The map view 340 displays a sequence setting column 342 in addition to the display of the map view 320 of FIG. 14.

The content producer successively juxtaposes thumbnail images of images whose order is to be defined in the sequence setting column 342. If not only images displayed in the non-setting image column 330 but also images to which a link is set already, namely, some of the images 322, 324, and 326a to 326c in the example in the figure, are included as images which become a definition target, then all of the images can be coupled directly or indirectly as a target of linking or forward feeding to each other.

When thumbnail images are juxtaposed in the sequence setting column 342, an operation for selecting a thumbnail image of a target image and moving the position of the thumbnail image to the sequence setting column 342, namely, an operation of "drag and drop," is carried out. Or, a thumbnail image may be selected separately on a selection screen image for identification information. An example of a screen image in which thumbnail images of images whose order is to be defined are juxtaposed in the order of the definition in such a manner as described above is the map view 350 of FIG. 16. In the map view 350, images whose identification information is "p1," "p2," "p3," "p4," "p5," . . . are arrayed in this order in the sequence setting column 342.

Since a link from the image 324 is set originally to the image 326a whose identification information is "p1" and the image 326b whose identification information is "p5," the lines 328 indicating the links are displayed as they are. Further, by connecting the images in the sequence setting column 342 through dotted lines 352a or the like, it is represented that a preceding-succeeding relationship of the images is defined.

Where the thumbnail images of images whose order is to be defined cannot be displayed at once in the sequence setting column 342, movement of the array is allowed in a horizontal direction by a scroll bar 354. In FIG. 14, it is demonstrated also by a dotted line 352b that an image string continues also after the image 326b. At this time, since the image 326c depicted in FIG. 15 is placed outside the sequence setting column 342, the line 328 representing the link is elongated so as to indicate the position of the image 326c on the line 328. It is to be noted that the images juxtaposed in the sequence setting column 342 can be deleted and replaced in the order thereof.

After the order is defined in such a manner as described above, a direction in which an image set as a link destination upon link returning operation is to be searched is set. FIG. 17 depicts a screen image on which a searching direction is to be set. A searching direction setting screen image 360 may be overlay-displayed on the map view 350 depicted in FIG. 16. The searching direction setting screen image 360 includes an image column 362 in which identification information of images is displayed as a list in an order defined in the sequence setting column 342 of the map view 350 and a searching direction column 364 which designates a searching direction from each image.

Figure 16:
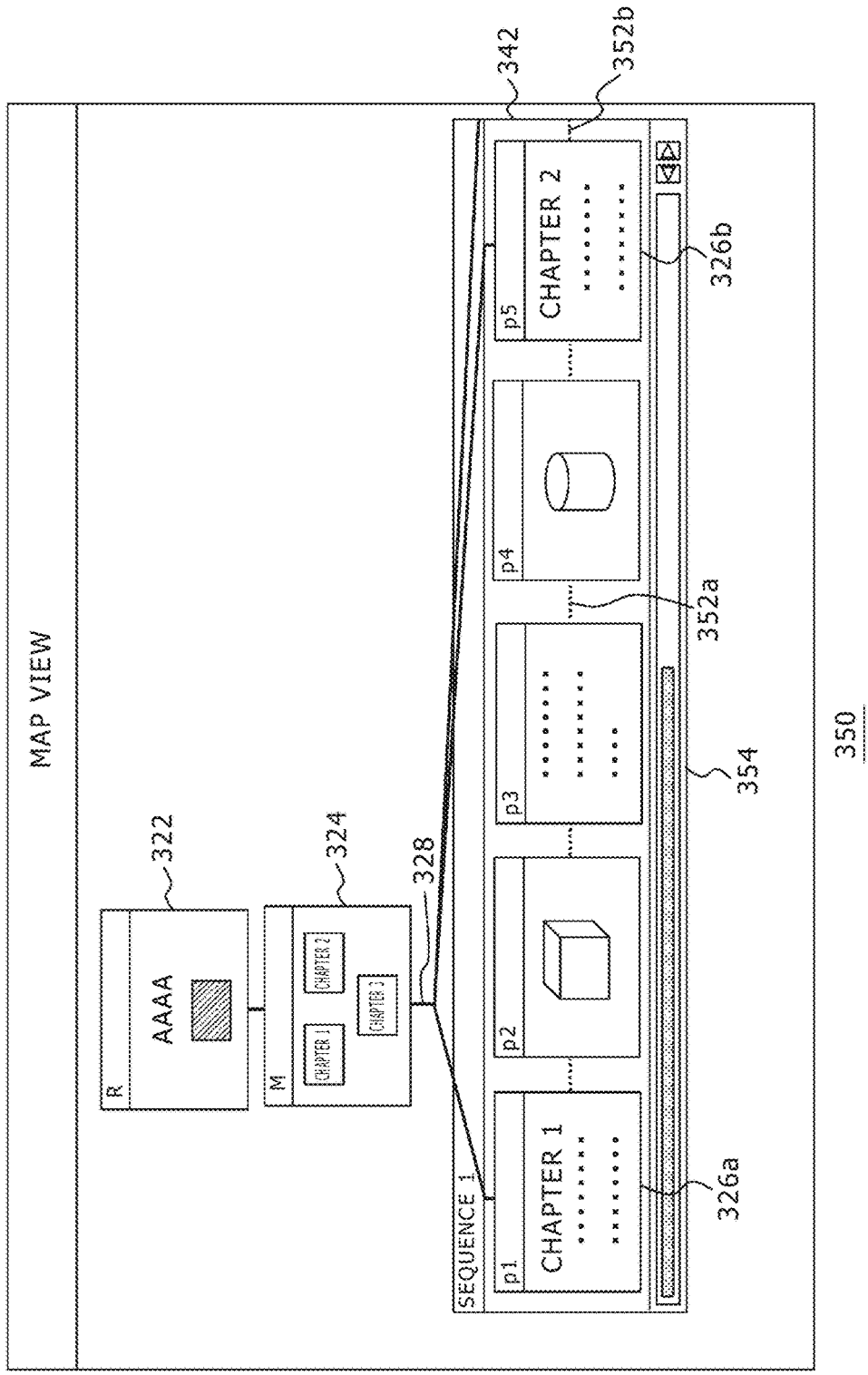
FIG. 16 is a view depicting a further example of a screen image rendered by the setting screen controlling unit in the present embodiment.

The image column 362 automatically displays identification numbers of the images in order of the array in the sequence setting column 342 of the map view 350 depicted in FIG. 16. First, "preceding direction" which is a default setting is described for all of images into the searching direction column 364. However, a setting for invalidation such as "-" is described for an image set as a link destination. The content producer carries out editing only for an image to which a searching direction is to be set to "succeeding direction." For example, a row of an image for which editing is to be carried out is selected and the choice is pull-down-displayed in the searching direction column 364. In this case, since two choices of "preceding direction" and "succeeding direction" are available, the searching direction is updated by selecting the "succeeding direction."

In the example of FIG. 17, a row 366 is set as an editing target and the searching direction column 364 therefor is updated to "succeeding direction." If determination inputting such as depression of the circle button 22 of the inputting apparatus 20 is carried out under the setting so far, then the setting file outputting unit 216 produces a sequence setting file 219 in the format depicted in FIG. 12 on the basis of the order of the images and the searching direction in the searching direction setting screen image 360. Then, the setting file outputting unit 216 stores the produced file 219 into the hard disk drive 50. It is to be noted that it may be a possible idea to make it possible to further set an image as a destination upon returning in response to a link returning operation in preparation for such a case that an image set as a link destination is a link destination of a plurality of links.

In this case, the setting file outputting unit 216 describes identification information of the image at the pertaining returning destination into the sequence setting file 219. For example, by setting the image at the returning destination as an image of the table of contents in the sequence setting file 219 for the image string of the text pages, whichever image of the text pages is being displayed or even if a different link to a text page is set, returning to the table-of-contents image can be carried out with certainty by a link returning operation.

Figure 18:
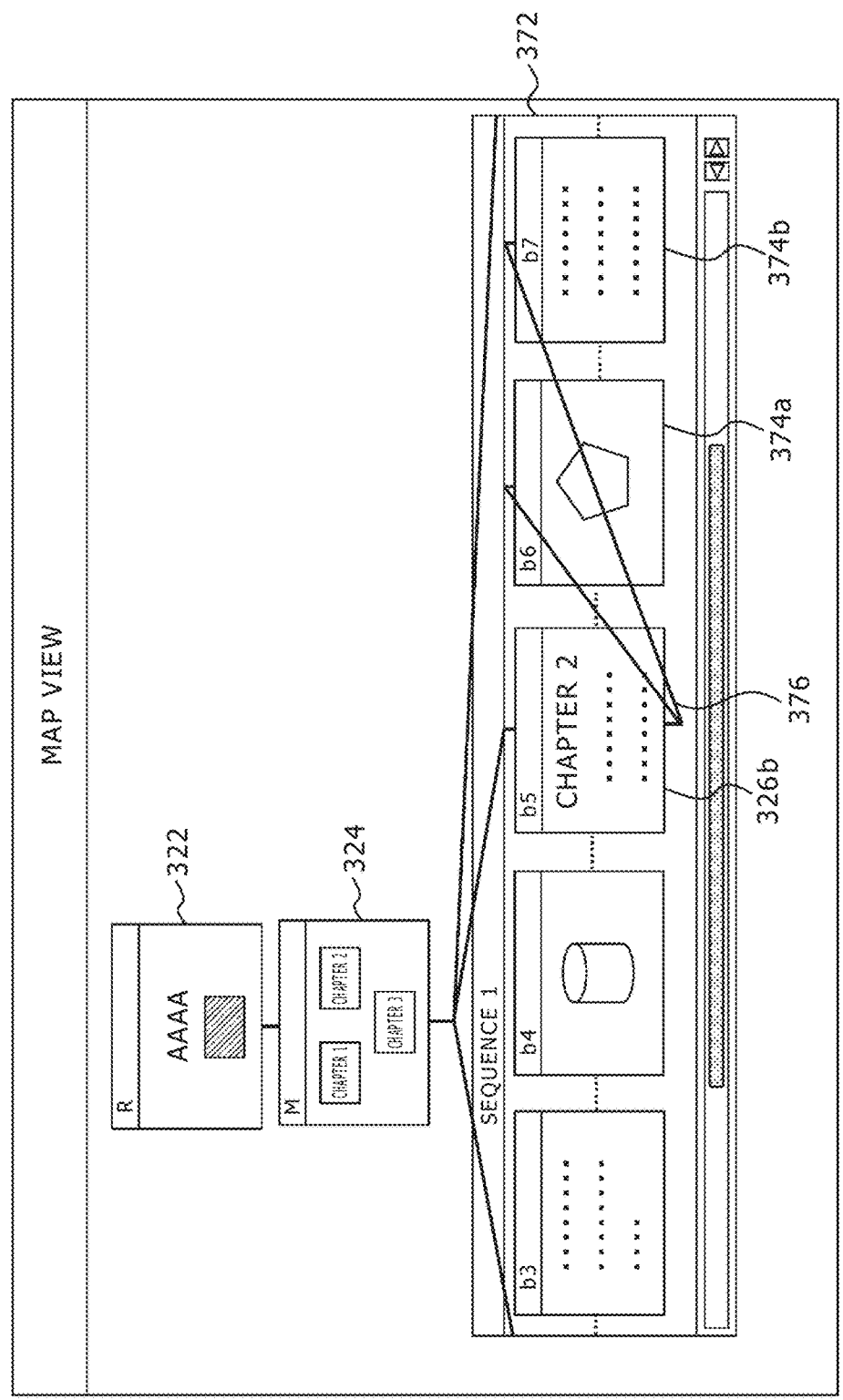
FIG. 18 is a view depicting a yet further example of a screen image rendered by the setting screen controlling unit in the present embodiment.

FIG. 18 depicts a modification to a relationship between images capable of being displayed on a map view. In a sequence setting column 372 in a map view 370, an order of images is defined similarly as in the sequence setting column 342 depicted in FIG. 16. Here, an image 326b corresponds to the image 326b depicted in FIG. 16 and is linked to the image 324 by a line representing the link. Further, in the case of FIG. 18, it is depicted by a line 376 that, on the image 326b, a link is set which has two link destinations the image 374a and the image 374b between which an order is defined together with the image 326b in the sequence setting column 372.

In this case, the display can be switched to the image 374a and then to the image 374b by a forward feeding operation of the images in a state in which the image 326b is displayed. In addition, the display can be switched to the image 374a or 374b also by zooming up of a given link region of the image 326b. Also such a setting as just described can be implemented by description thereof into the link setting file associated with the data of the image 326b. As depicted in the map view 370, also such a complicated setting as described above can be grasped at first glance from a dotted line representing the preceding-succeeding relationship and the line 376 representing the link in the sequence setting column 372.

Figure 19:
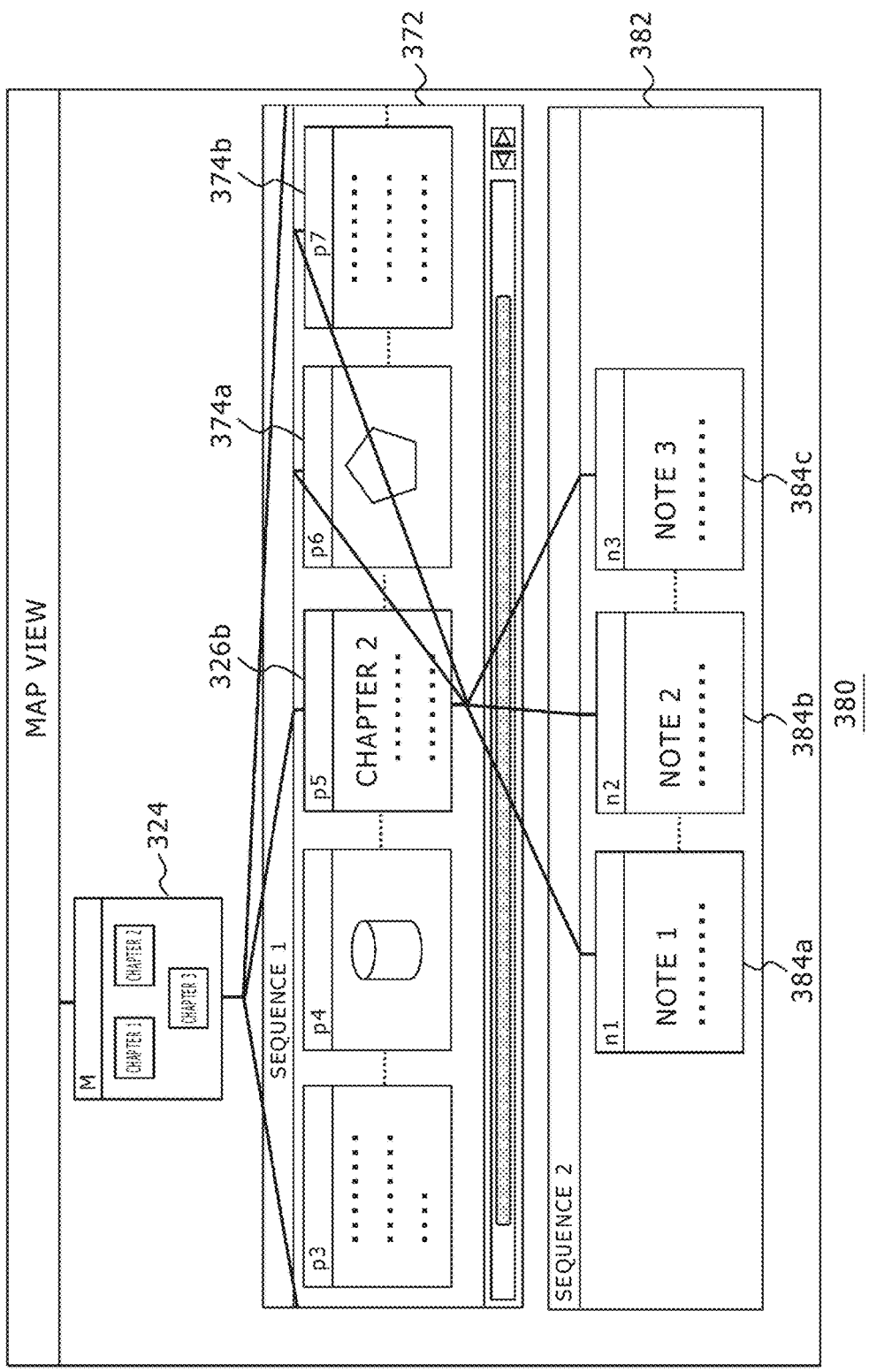
FIG. 19 is a view depicting a yet further example of a screen image rendered by the setting screen controlling unit in the present embodiment.

FIG. 19 depicts another modification to the relationship between images capable of being displayed in a map view. In a map view 380, an order is defined for a further different image set in addition to the setting carried out in the map view 370 of FIG. 18. To this end, a second sequence setting column 382 is displayed in addition to the sequence setting column 372 depicted in FIG. 18. Three or more image sets in which an order is to be defined may be applied, and a sequence setting column is additionally provided every time the content producer newly carries out inputting for the instruction to start production of a sequence setting file. A setting method similar to that described above may be applied.

In the case of FIG. 19, it can be recognized that, in a link setting file associated with the image data of the image 326b, links whose link destinations are the images 374a and 374b between which an order is defined together with each other in the sequence setting column 372 and links whose link destinations are the images 384a, 384b and 384c among which an order is defined in the different sequence setting column 382 are set. By such a setting as just described, the image switching which can be implemented in FIG. 18 can be carried out. In addition, not only switching of an image can be carried out directly to any of the images 384a, 384b and 384c but also forward feeding of an image between the images 384a, 384b and 384c can be carried out by zooming up a given link region of the image 326b.

It is to be noted that, while the lines representing the links indicated in the map views of FIGS. 14 to 16, 18 and 19 are displayed on the basis of a link setting file set in advance, the setting may be changed in the map view. For example, a certain line is selected, and an operation for deleting the selected line is accepted. In this case, the setting file outputting unit 216 updates the link setting file so that the setting of the corresponding link is invalided.

Further, it may be made possible to plot a line between images to add a setting of a link. At this time, a window image in which images of a link source and a link destination are displayed in an enlarged scale is displayed separately such that a link area can be designated on each image or a link condition can be selected. In accordance with this, the setting file outputting unit 216 adds a description of a newly set link to the link setting file associated with the image of the link source.

Figure 20:
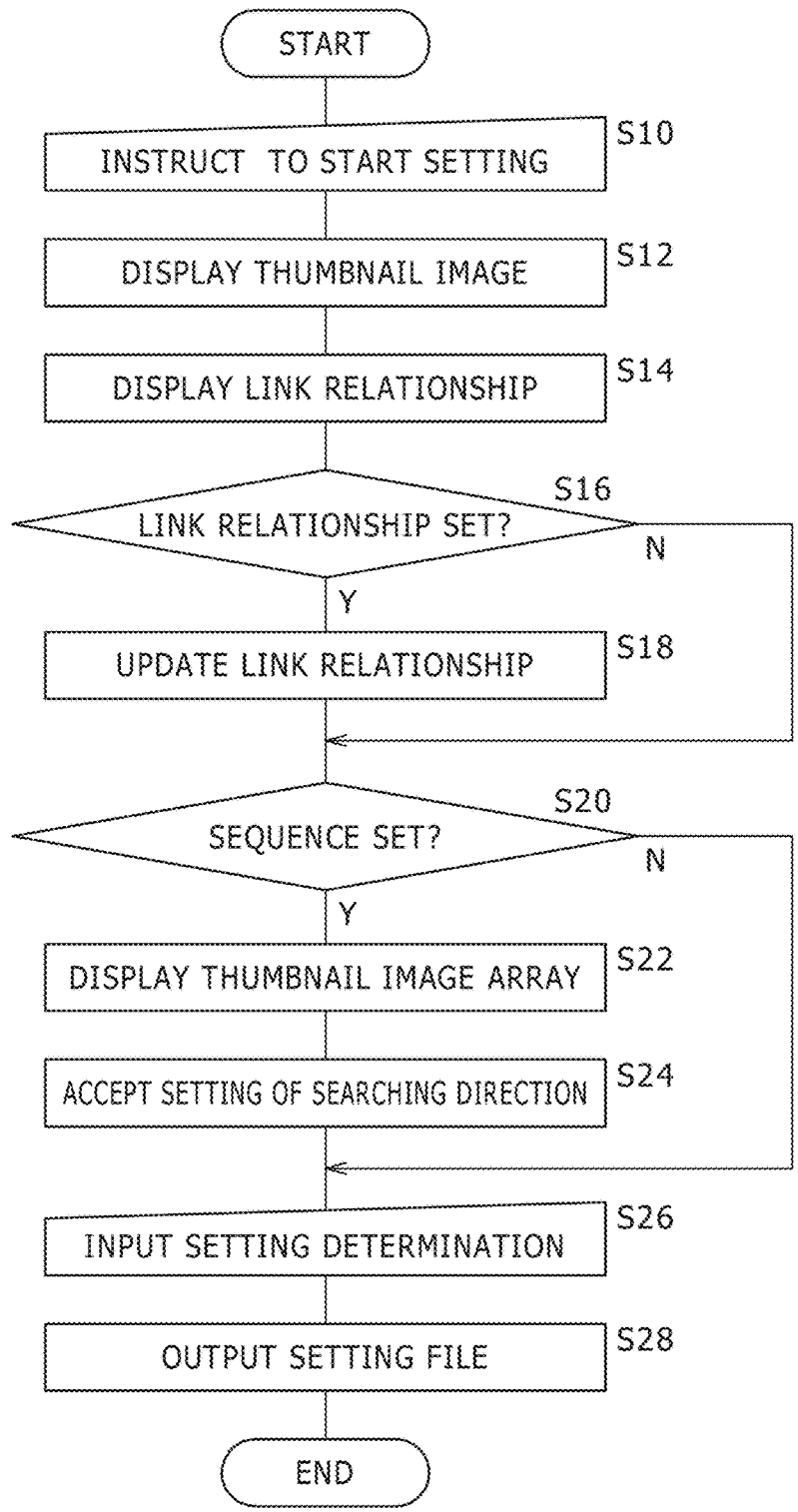
FIG. 20 is a flow chart illustrating a processing procedure for supporting content production by the information processing apparatus of the present embodiment.

Now, operation when content production is supported by the information processing apparatus 10 having the configuration of FIG. 13 is described. FIG. 20 is a flow chart illustrating a processing procedure for supporting content production by the information processing apparatus 10. First, the content producer would carry out inputting for the instruction to start setting in a state in which the image data 201 and the link setting file 218 are stored in the hard disk drive 50 (S10). Then, the setting screen controlling unit 214 displays thumbnail images of images, which may become a target, together with identification information of the images in the map view (S12).

At this time, images between which a link is set by the link setting file 218 are connected by a line to represent a link relationship between the images (S14). If an operation for deleting or adding a line representing a link is carried out (Y at S16), then the setting screen controlling unit 214 reflects the operation on the map view (S18). On the other hand, if inputting for the instruction to produce a sequence setting file is carried out (Y at S20), then a sequence setting column is displayed in the map view and the thumbnail images are juxtaposed in an order in accordance with the setting of the content producer (S22).

Then, the searching direction setting screen image is displayed and a setting of a searching direction of each image is accepted (S24). Every time the content producer carries out setting while watching the map view or the searching direction setting screen image, the setting screen controlling unit 214 updates the map view or the searching direction setting screen image (S16 to S24). Then, if inputting for finally determining the setting is carried out, then the setting file outputting unit 216 carries out updating of the link setting file or production of a sequence setting file and outputs the resulting file to the hard disk drive 50 (526, S28).

With the present embodiment described above, a link or an order is defined for images which configure a content such as an electronic book, and a display image is switched by a view point movement operation or a forward feeding operation of an image. By suitably carrying out definition of a link or an order, a content having good accessibility capable of coping with various situations can be produced in view of the substance of the content and so forth. By visualizing a relationship among images using thumbnail images and graphics in the step of producing such a content, the setting substance at present can be grasped at first glance and later setting can be carried out suitably.

Consequently, even if the number of images to be incorporated into a content increases or association among images is complicated, content production is facilitated. Further, not only the setting substance of a content produced formerly can be easily confirmed but also revision or correction of a content is facilitated in that a new image is added to the content and an unfavorable portion is specified.

The present invention has been described above in connection with the embodiment thereof. The embodiment is an example, and it can be recognized by those skilled in the art that various modifications are possible with regard to the combinations of the components and the processes of the embodiment and also such modifications fall within the scope of the present invention.

REFERENCE SIGNS LIST

1 Information processing system, 10 Information processing apparatus, 12 Display apparatus, 20 Inputting apparatus, 38 Tile image, 44 Display processing section, 50 Hard disk drive, 60 Main memory, 100 Control section, 101 Image data, 102 Input information acquisition unit, 104 Display area determination unit, 114 Display image processing unit, 116 Image switching controlling unit, 118 Link setting file, 119 Sequence setting file, 202 Input information acquisition unit, 214 Setting screen controlling unit, 216 Setting file outputting unit, 201 Image data, 218 Link setting file, 219 Sequence setting file.

INDUSTRIAL APPLICABILITY

As described above, the present invention can be utilized for information processing apparatus such as a computer, an information terminal, an image processing apparatus, an image display apparatus, and a game machine.

The invention claimed is:

1. An information processing apparatus, comprising:
a data storage unit configured to store data of a content, which is configured from data of a plurality of images and a plurality of setting files to which, in order to make, when the plural images are to be displayed on a display apparatus through switching by a user operation, a processing procedure, which is to be used for determination of an image of a switching destination, different depending upon used operation means, information of different kinds necessary for the individual processing procedures is set; and
a setting screen controlling unit configured to specify, on the basis of the plural setting files, preceding-succeeding relationships of the images when the image is switched by the processing procedures and display a correlation map in which the preceding-succeeding relationships are represented by reduced images of the plural images and graphics which connect the reduced images to each other thereby to represent switching orders of the images by the plural processing procedures through a single screen image;
wherein the individual processing procedures include a first processing procedure, the first processing procedure being a first navigation processing for navigating the content according to a link between two images of the plurality of images, the two linked images being non-sequential images relative to one another based on a pre-determined sequence of the plurality of images;
wherein the individual processing procedures include a second processing procedure, the second processing procedure being a second navigation processing for navigating the content according to the pre-determined sequence of the plurality of images;
wherein the first processing procedure can be executed by direct selection of a link area, the link area being a region that triggers generation of the link, or by zooming the display area by a viewpoint moving operation until the display area is included in the link area; and
wherein the pre-determined sequence establishes sequential groups of sequential images, such that in the predetermined sequence, a last image of a group is followed by a first image of a next group; and
wherein each of the first images of the groups is a link destination from a respective link area identifying the group to which the first image belongs; and
wherein a link area return operation by a user, when performed on a last image of the group to which the last image belongs, results in navigation to a link area identifying the next group, and when performed on other images of the group to which the last image belongs, results in navigation to a link area identifying the group.

2. The information processing apparatus according to claim 1, wherein the plural setting files include:
   a link setting file in which information, which is set for a first image switching processing procedure for carrying out, in response to an operation for changing a display area of one of images being displayed, image switching when a positional relationship between the display area and a setting area satisfies a given condition and which associates the setting area and the image of the switching destination with each other, is described; and
   a sequence setting file which is set for a second image switching processing procedure for carrying out image switching in response to an image forward feeding operation and describes an order of the images, and
   the setting screen controlling unit represents preceding-succeeding relationships of the images determined by the first image switching processing procedure on the basis of the link setting file and preceding-succeeding relationships of the images determined by the second image switching processing procedure on the basis of the sequence setting file using different graphics from each other for the connection of the images.

3. The information processing apparatus according to claim 1, wherein the setting screen controlling unit further displays reduced images of non-set images included in the plural images but not included in any of the preceding-succeeding relationships of the images specified on the basis of the plural setting files, and
   the information processing apparatus further comprises:
   an input information acquisition unit configured to accept an input for connecting a reduced image of any of the non-set images to a reduced image of any other image in the correlation map; and
   a setting file outputting unit configured to update one of the setting files so that a new preceding-succeeding relationship may be generated in image switching on the display unit in accordance with the input for the connection.

4. The information processing apparatus according to claim 1, further comprising:
   an input information acquisition unit configured to accept an input for deleting the graphic which connects reduced images of the images on the correlation map; and
   a setting file outputting unit configured to update one of the setting files so that the preceding-succeeding relationship corresponding to the deleted graphic may disappear in the image switching on the display apparatus.

5. The information processing apparatus according to claim 2, wherein the setting screen controlling unit renders a sequence setting column in which reduced images of images between which an order is to be set in the sequence setting file are to be arrayed, and
   the information processing apparatus further comprises:
   an input information acquisition unit configured to accept an input for successively disposing reduced images of the images between which an order is to be set into a new sequence setting column; and
   a setting file outputting unit configured to produce a new sequence setting file corresponding to the new sequence setting column.

6. The information processing apparatus according to claim 5, wherein the setting screen controlling unit represents the preceding-succeeding relationship between the images determined by the first image switching processing procedure on the basis of the link setting file by connecting reduced images of the images to each other using a line, and elongates or contracts, when the input information acquisition unit accepts an input for disposing a reduced image of one image connected to a different image depending upon the preceding-succeeding relationship into the sequence setting column corresponding to the second image switching processing procedure, the line which connects the image and the different image to each other in response to a movement of the reduced image.

7. An information processing method, comprising the steps of:
   reading out, from a storage apparatus, data of a content, which is configured from data of a plurality of images and a plurality of setting files to which, in order to make, when the plural images are to be displayed on a display apparatus through switching by a user operation, a processing procedure, which is to be used for determination of an image of a switching destination, different depending upon used operation means, information of different kinds necessary for the individual processing procedures is set; and
   specifying, on the basis of the plural setting files, preceding-succeeding relationships of the images when the image is switched by the processing procedures and displaying, on a display apparatus, a correlation map in which the preceding-succeeding relationships are represented by reduced images of the plural images and graphics which connect the reduced images to each other thereby to represent switching orders of the images by the plural processing procedures through a single screen image;
   wherein the individual processing procedures include a first processing procedure, the first processing procedure being a first navigation processing for navigating the content according to a link between two images of the plurality of images, the two linked images being non-sequential images relative to one another based on a pre-determined sequence of the plurality of images;
   wherein the individual processing procedures include a second processing procedure, the second processing procedure being a second navigation processing for navigating the content according to the pre-determined sequence of the plurality of images;
   wherein the first processing procedure can be executed by direct selection of a link area, the link area being a region that triggers generation of the link, or by zooming the display area by a viewpoint moving operation until the display area is included in the link area; and
   wherein the pre-determined sequence establishes sequential groups of sequential images, such that in the predetermined sequence, a last image of a group is followed by a first image of a next group; and
   wherein each of the first images of the groups is a link destination from a respective link area identifying the group to which the first image belongs; and
   wherein a link area return operation by a user, when performed on a last image of the group to which the last image belongs, results in navigation to a link area identifying the next group, and when performed on other images of the group to which the last image belongs, results in navigation to a link area identifying the group.

8. A computer operating under the control of a computer program which causes a computer to implement the functions, comprising:
- reading out, from a storage apparatus, data of a content, which is configured from data of a plurality of images and a plurality of setting files to which, in order to make, when the plural images are to be displayed on a display apparatus through switching by a user operation, a processing procedure, which is to be used for determination of an image of a switching destination, different depending upon used operation means, information of different kinds necessary for the individual processing procedures is set; and
- specifying, on the basis of the plural setting files, preceding-succeeding relationships of the images when the image is switched by the processing procedures and displaying, on a display apparatus, a correlation map in which the preceding-succeeding relationships are represented by reduced images of the plural images and graphics which connect the reduced images to each other thereby to represent switching orders of the images by the plural processing procedures through a single screen image;
- wherein the individual processing procedures include a first processing procedure, the first processing procedure being a first navigation processing for navigating the content according to a link between two images of the plurality of images, the two linked images being non-sequential images relative to one another based on a pre-determined sequence of the plurality of images;
- wherein the individual processing procedures include a second processing procedure, the second processing procedure being a second navigation processing for navigating the content according to the pre-determined sequence of the plurality of images; and
- wherein the first processing procedure can be executed by direct selection of a link area, the link area being a region that triggers generation of the link, or by zooming the display area by a viewpoint moving operation until the display area is included in the link area; and
- wherein the pre-determined sequence establishes sequential groups of sequential images, such that in the predetermined sequence, a last image of a group is followed by a first image of a next group; and
- wherein each of the first images of the groups is a link destination from a respective link area identifying the group to which the first image belongs; and
- wherein a link area return operation by a user, when performed on a last image of the group to which the last image belongs, results in navigation to a link area identifying the next group, and when performed on other images of the group to which the last image belongs, results in navigation to a link area identifying the group.

9. A non-transitory computer-readable recording medium on or in which a computer program is recorded, the computer program causing a computer to implement the functions, comprising:
- reading out, from a storage apparatus, data of a content, which is configured from data of a plurality of images and a plurality of setting files to which, in order to make, when the plural images are to be displayed on a display apparatus through switching by a user operation, a processing procedure, which is to be used for determination of an image of a switching destination, different depending upon used operation means, information of different kinds necessary for the individual processing procedures is set; and
- specifying, on the basis of the plural setting files, preceding-succeeding relationships of the images when the image is switched by the processing procedures and displaying, on a display apparatus, a correlation map in which the preceding-succeeding relationships are represented by reduced images of the plural images and graphics which connect the reduced images to each other thereby to represent switching orders of the images by the plural processing procedures through a single screen image;
- wherein the individual processing procedures include a first processing procedure, the first processing procedure being a first navigation processing for navigating the content according to a link between two images of the plurality of images, the two linked images being non-sequential images relative to one another based on a pre-determined sequence of the plurality of images;
- wherein the individual processing procedures include a second processing procedure, the second processing procedure being a second navigation processing for navigating the content according to the pre-determined sequence of the plurality of images;
- wherein the first processing procedure can be executed by direct selection of a link area, the link area being a region that triggers generation of the link, or by zooming the display area by a viewpoint moving operation until the display area is included in the link area; and
- wherein the pre-determined sequence establishes sequential groups of sequential images, such that in the predetermined sequence, a last image of a group is followed by a first image of a next group; and
- wherein each of the first images of the groups is a link destination from a respective link area identifying the group to which the first image belongs; and
- wherein a link area return operation by a user, when performed on a last image of the group to which the last image belongs, results in navigation to a link area identifying the next group, and when performed on other images of the group to which the last image belongs, results in navigation to a link area identifying the group.

* * * * *